United States Patent
Hayashi

(10) Patent No.: US 10,250,771 B2
(45) Date of Patent: Apr. 2, 2019

(54) INFORMATION PROCESSING SYSTEM, INFORMATION PROCESSING APPARATUS, AND INFORMATION PROCESSING METHOD

(71) Applicant: Yuuichiroh Hayashi, Kanagawa (JP)

(72) Inventor: Yuuichiroh Hayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/592,665

(22) Filed: May 11, 2017

(65) Prior Publication Data

US 2017/0346981 A1 Nov. 30, 2017

(30) Foreign Application Priority Data

May 27, 2016 (JP) ................................ 2016-105848

(51) Int. Cl.
*H04N 1/00* (2006.01)
*H04N 1/32* (2006.01)
*H04N 1/327* (2006.01)

(52) U.S. Cl.
CPC ..... *H04N 1/00949* (2013.01); *H04N 1/00941* (2013.01); *H04N 1/32133* (2013.01); *H04N 1/32769* (2013.01); *H04N 2201/0094* (2013.01); *H04N 2201/3208* (2013.01); *H04N 2201/3209* (2013.01); *H04N 2201/3242* (2013.01)

(58) Field of Classification Search
None
See application file for complete search history.

(56) References Cited

U.S. PATENT DOCUMENTS

| | | | |
|---|---|---|---|
| 2010/0138835 A1 | 6/2010 | Yagi | |
| 2011/0041140 A1* | 2/2011 | Harm | G06F 9/4843 719/318 |
| 2013/0208310 A1* | 8/2013 | Nakashima | H04N 1/00244 358/1.15 |
| 2016/0241724 A1 | 8/2016 | Sugimura et al. | |
| 2017/0344921 A1* | 11/2017 | Leonelli | G06Q 10/06311 |

FOREIGN PATENT DOCUMENTS

| | | |
|---|---|---|
| JP | 2010-128948 | 6/2010 |
| JP | 2010-166614 | 7/2010 |
| JP | 2016-154000 | 8/2016 |

\* cited by examiner

*Primary Examiner* — Frantz Bataille
(74) *Attorney, Agent, or Firm* — Oblon, McClelland, Maier & Neustadt, L.L.P.

(57) ABSTRACT

An information processing system includes at least one information processing apparatus. The system includes a memory and circuitry. The memory stores, for each of a plurality of flows, each flow containing a series of processes executable to electronic data, flow information that defines program identification information identifying one or more programs executing the flow of series of processes and an execution order of the one or more programs, in association with flow identification information. The memory further stores event identification information in association with the flow identification information. Based on an occurrence of an event, the circuitry reads the flow identification information associated with the event identification information identifying the occurred event, and controls the at least one information processing apparatus to execute each of the one or more programs in the execution order, as defined in the flow information identified by the read flow identification information.

10 Claims, 21 Drawing Sheets

FIG. 5A

COMMON I/F OF FILE PROCESS UNIT

| COMMON I/F | SUMMARY |
|---|---|
| /EXTERNAL SERVICE NAME/process/file | TO ACQUIRE FILE FROM DESIGNATED EXTERNAL SERVICE |
| /EXTERNAL SERVICE NAME/process/folder | TO STORE FILE IN DESIGNATED EXTERNAL SERVICE |
| . . . | . . . |

FIG. 5B

UNIQUE I/F OF FILE PROCESS UNIT

| UNIQUE I/F | SUMMARY |
|---|---|
| /EXTERNAL SERVICE NAME/process/extension/attach | TO ATTACH ELECTRONIC FILE TO DOCUMEN STORED IN DESIGNATED EXTERNAL SERVICE |
| . . . | . . . |

FIG. 5C

COMMON I/F OF DATA PROCESS UNIT

| COMMON I/F | SUMMARY |
|---|---|
| /EXTERNAL SERVICE NAME/data/files | TO ACQUIRE LIST OF ELECTRONIC FILES FROM DESIGNATED EXTERNAL SERVICE |
| /EXTERNAL SERVICE NAME/data/folders | TO ACQUIRE LIST OF FOLDERS FROM DESIGNATED EXTERNAL SERVICE |
| . . . | . . . |

FIG. 5D

UNIQUE I/F OF DATA PROCESS UNIT

| UNIQUE I/F | SUMMARY |
|---|---|
| /EXTERNAL SERVICE NAME/data/extension/images | TO ACQUIRE LIST OF IMAGE FILES FROM DESIGNATED EXTERNAL SERVICE |
| . . . | . . . |

FIG. 7

| DATA TYPE BEFORE CONVERSION | DATA TYPE AFTER CONVERSION | TYPE CONVERSION TO BE GENERATED |
|---|---|---|
| InputStream | LocalFilePath | FIRST TYPE-CONVERSION |
| LocalFilePath | File | SECOND TYPE-CONVERSION |
| ... | ... | ... |

```
"flowName":"OCR DELIVERY", ~1101                      ~1102
"flowDetails":[                                       ~1103
    {
       "componentName":"OCR COMPONENT",
       "parameters":{
              "language":"English",
              "outputType":"pdf"
       }
    },
    {
       "componentName":"STORAGE-A DELIVERY COMPONENT",
       "parameters":{
              "folderId":"folderA"
       }
    }
]
                                                      ~1104
```

1100

```
"triggerId":"t001",                          ~2001
"triggerType":"MAIL",                        ~2002
"type_options":{
        "address":"abc@xyz.co.jp",           ~2003
},
"condition":{
        "when":"immediately"                 ~2004
},
"flowName":"OCR DELIVERY"                    ~2005
```
2000

FIG. 13A

```
<html>
  <head>
    <title>Mail Application</title>
    <script src="./js/mail.js" ></script>
    <script>
      function file_function(){ ~ FILE SELECTION PROCESS ~ }
      function mail_function(){ ~ MAIL TRANSMISSION PROCESS ~ }
    </script>
    <style type="text/css" >
      ul li { list-style:none;}
    </style>
  </head>
  <body>
    <h1>Mail Application</h1>
    <form neme="mail_send" >
      <ul>
        <li class="file" >
          <label for="filename" >Attachment File<label>
          <button onclick=" file_function()" >select</button>
          <button onclick=" mail_function()" >Execute</button>
        </li>
      </ul>
    </form>
  </body>
</html>
```

Mail Application

Attachment File    [ select ] 4201    [ Execute ] 4202

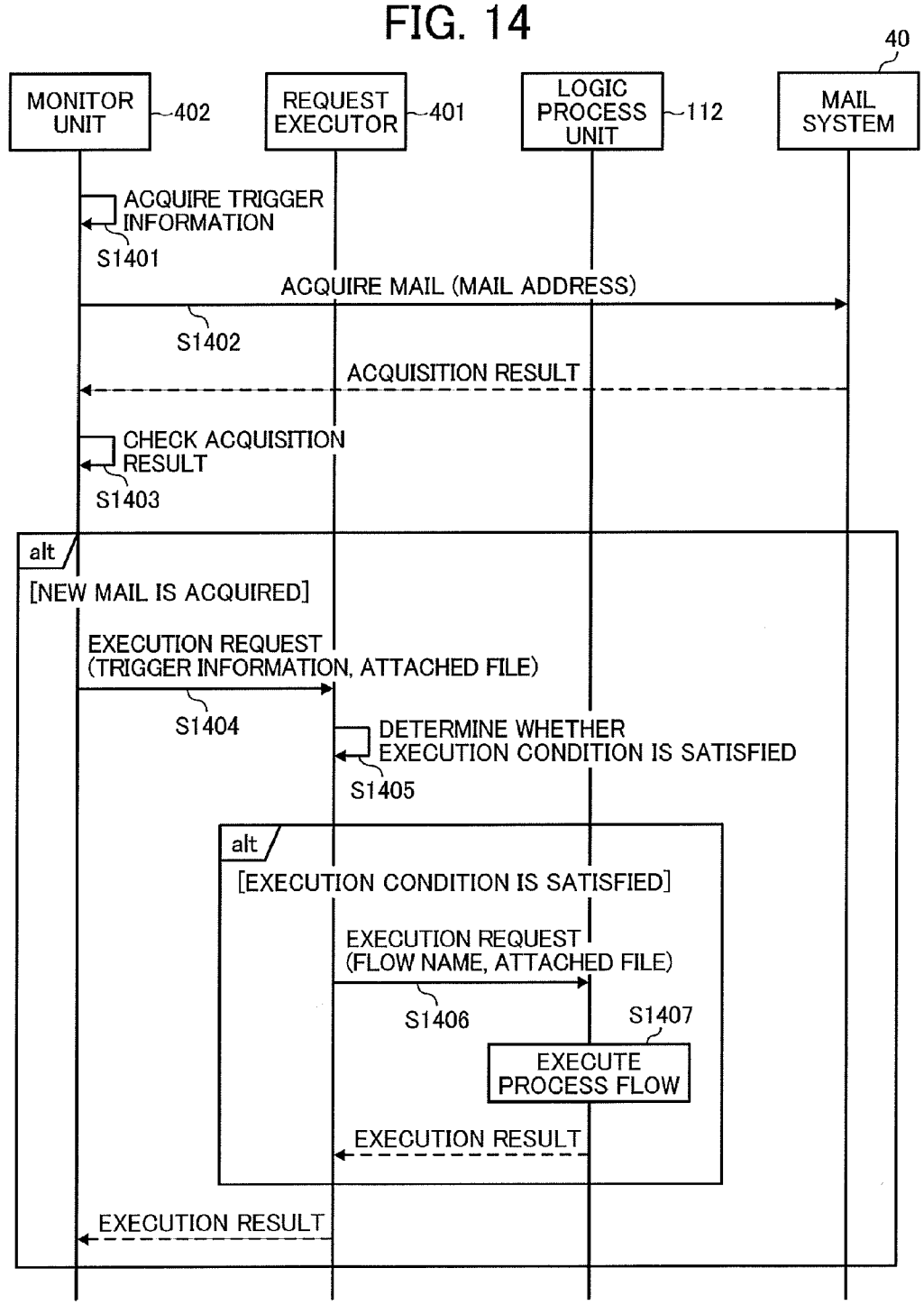

FIG. 20

| COMPONENT NAME | PARAMETER |
|---|---|
| OCR COMPONENT | language |
| | outputType |
| STORAGE-A DELIVERY COMPONENT | folderId |
| ... | ... |

| TRIGGER TYPE | OPTION | EXECUTION CONDITION |
|---|---|---|
| MAIL | address | when |
| FAX | number | when |
| FILE STORAGE | folderId | when |
| ... | ... | ... |

5200

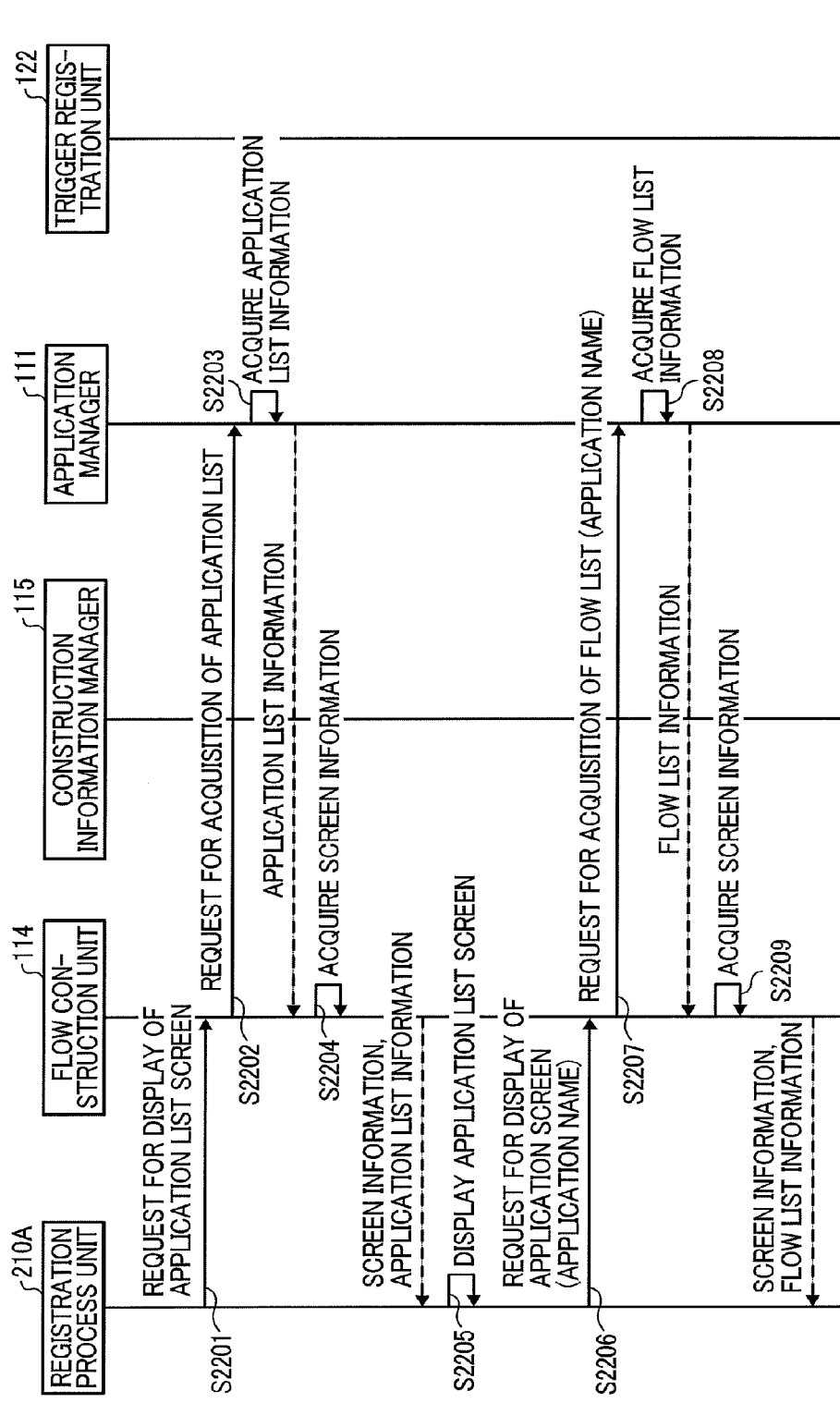

INFORMATION PROCESSING SYSTEM, INFORMATION PROCESSING APPARATUS, AND INFORMATION PROCESSING METHOD

CROSS-REFERENCE TO RELATED APPLICATION

This patent application is based on and claims priority pursuant to 35 U.S.C. § 119(a) to Japanese Patent Application No. 2016-105848, filed on May 27, 2016, the entire disclosure of which is hereby incorporated by reference herein.

BACKGROUND

Technical Field

The present disclosure relates to an information processing system, an information processing apparatus, and an information processing method.

Description of the Related Art

In recent years, various cloud services are provided by cloud computing or the like. Examples of the cloud services provided by cloud computing include a mail service, a storage service, and a facsimile transmission service.

In addition, a technique is known that defines a type of an image processing service or a delivery processing service and a processing order of each service to enable execution of a process flow such as a workflow.

SUMMARY

An information processing system includes at least one information processing apparatus. The system includes a memory and circuitry. The memory stores, for each of a plurality of flows, each flow containing a series of processes executable to electronic data, flow information that defines program identification information identifying one or more programs executing the flow of series of processes and an execution order of the one or more programs, in association with flow identification information. The memory further stores event identification information in association with the flow identification information. Based on an occurrence of an event, the circuitry reads the flow identification information associated with the event identification information identifying the occurred event, and controls the at least one information processing apparatus to execute each of the one or more programs in the execution order, as defined in the flow information identified by the read flow identification information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIGS. 5A to 5D are illustrations for explaining examples of a common interface and a unique interface according to an embodiment of the present disclosure;

FIG. 7 is a view illustrating an example of a type-conversion information table according to an embodiment of the present disclosure;

FIG. 8 is a view illustrating an example of process flow information according to an embodiment of the present disclosure;

FIG. 13A is a view illustrating an example of screen information according to an embodiment of the present disclosure;

FIG. 13B is a view illustrating an example of a mail transmission screen according to an embodiment of the present disclosure;

FIG. 14 is a sequence diagram illustrating a subsequent part (2/2) of steps in an operation of utilizing a service according to an embodiment of the present disclosure;

FIG. 20 is a view illustrating an example of component list information according to still another embodiment of the present disclosure;

FIG. 21 is a view illustrating an example of the trigger information according to still another embodiment of the present disclosure;

FIGS. 22A and 22B are a sequence diagram illustrating steps in an operation of registering a trigger and a process flow according to still another embodiment of the present disclosure;

Figure 1:
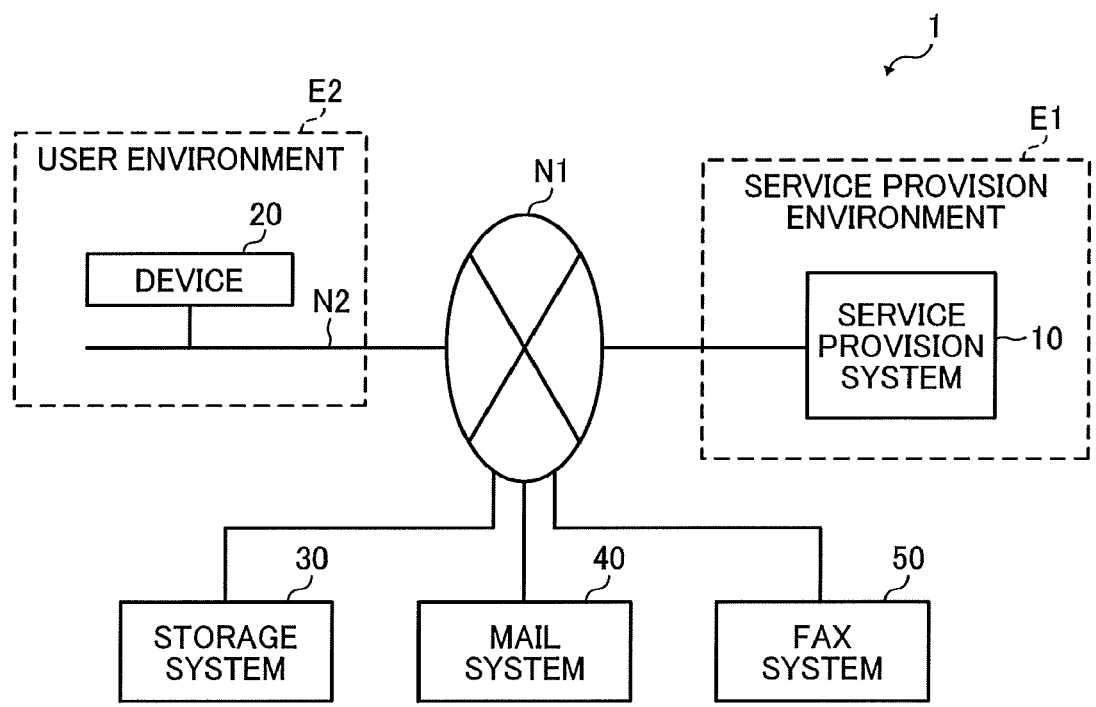
FIG. 1 a schematic view illustrating an example configuration of an information processing system according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of several embodiments of the present disclosure with reference drawings.

First Embodiment

First, a description is given of a system configuration of an information processing system 1 according to a first embodiment with reference to FIG. 1. FIG. 1 a schematic view illustrating an example configuration of the information processing system 1 according to the first embodiment.

As illustrated in FIG. 1, the information processing system 1 includes a service provision environment E1, a user environment E2, which are communicably connected to each other via a wide area network N1 such as the Internet. Further, the service provision environment E1 and the user environment E2 are communicably connected to a storage system 30, a mail system 40, and facsimile system 50 via the network N1.

The storage system 30 is a computer system that provides a storage service. The mail system 40 is a computer system that provides a mail service. Further, the facsimile system 50 is a computer system that provides a facsimile service.

The storage service is a cloud service that provides functions of a storage server, such as offering storage space. The mail service is a cloud service that provides functions of a mail server, such as mail exchange or mail transfer. Further, the facsimile service is a cloud service that provides functions of a facsimile server, such as facsimile transmission.

The service provision environment E1 is a system environment of a service provider that provides services in cooperation with an external service such as a cloud service through the network N1. Although in the present embodiment a description is given of an example in which the external service is implemented by the cloud service, the present embodiment is not limited thereto. For example, the present embodiment may be applied to various external services provided via a network. Examples of the external services include a service provided by an application service provider (ASP), and a Web service.

The service provision environment E1 includes a service provision system 10. The service provision system 10 is implemented by at least one information processing apparatus (computer). The service provision system 10 provides a device 20 (described later) with predetermined services via the network N1.

For example, in response to an occurrence of a predetermined triggering event, the service provision system 10 provides a service that performs optical character recognition (OCR) processing on an electronic file specified by the device 20 and delivers (uploads) the electronic file to the storage system 30. This service may be referred to as an "OCR delivery service" hereinafter.

However, this service is one example of the service provided by the service provision system 10, and the service provision system 10 may provide any other suitable service. For example, in response the occurrence of a predetermined triggering event, the service provision system 10 may provide a service that converts an electronic file specified by the device 20 to a predetermined data format and deliver the electronic file to the storage system 30. In addition, for example, in response to the occurrence of a predetermined triggering event, the service provision system 10 may provide a service that converts an electronic file specified by the device 20 to a predetermined data format and deliver the electronic file as an electronic mail.

As described heretofore, the service provision system 10 according to the present embodiment provides services in response to the occurrence of a predetermined triggering event.

In this disclosure, examples of the triggering event include transmitting an email to a predetermined mail address, transmitting a facsimile to a predetermined phone number, and storing an electronic file in a predetermined folder. In other words, the service provision system 10 provides services such as the OCR delivery service, when the device 20 transmits an email to a predetermined mail address using the mail service provided by the mail system 40.

In substantially the same manner, for example, the service provision system 10 is also able to provide services such as the OCR delivery service, when the device 20 transmits a facsimile to a predetermined phone number using the facsimile service provided by the facsimile system 50. In addition, in substantially the same manner, for example, the service provision system 10 is also able to provide services such as the OCR delivery service, when the device 20 stores an electronic file in a predetermined folder using the storage service provided by the storage system 30.

In the present embodiment, a description is given of an example in which the service provision system 10 provides the OCR delivery service, triggered by the mail transmission to the predetermined mail address.

The user environment E2 is, for example, a system environment of a user (service user) who uses the services provided by the service provision system 10. The user environment E2 includes at one or more devices 20 that are communicably connected to one another via a network N2 such as a local area network (LAN).

The device 20 according to the present embodiment is, for example, an electronic apparatus such as an image forming apparatus such as a multifunction peripheral (MFP), a projector, an electronic white board, a digital camera, a smartphone, a tablet, and a game device. In other words, the device 20 is an electronic apparatus that is capable of performing at least one of an input of electronic files and an output of electronic files. The user is able to use the services provided by the service provision system 10 by using the device 20.

The configuration illustrated in FIG. 1 is just an example of the configuration of the information processing system 1, and the information processing system 1 may have any other suitable system configuration. For example, the service provision system 10 itself or a part of the one or more information processing apparatuses constituting the service provision system 10 may be included in the user environment E2.

Further, at least one of the storage system 30, the mail system 40 and the facsimile system 50 may be included in the service provision environment E1 or the user environment E2. In other words, at least one of the storage service, the mail service and the facsimile service may be provided by the service provider or the service user.

Furthermore, the storage systems 30, the mail systems 40 and the facsimile systems 50 that are communicably connected to the service provision environment E1 and the user environment E2 could be more than one. For example, the service provision system 10 may be communicably connected to a storage system 30A that provides a storage service whose external service name is "Storage A" and a storage system 30B that provides a storage service whose external service name is "Storage B".

Hereinafter, a description is given of hardware configurations of the service provision system 10 and the device 20 according to the present embodiment.

Figure 2:
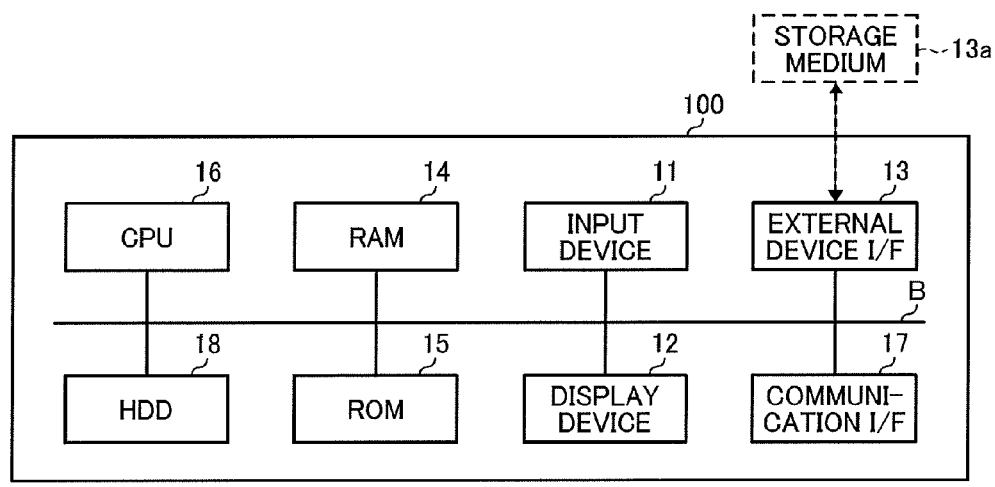
FIG. 2 is a block diagram illustrating an example hardware configuration of a computer according to an embodiment of the present disclosure.

First, a description is given of a hardware configuration of the information processing apparatus (computer 100) that implements the service provision system 10 with reference to FIG. 2. FIG. 2 is a block diagram illustrating an example hardware configuration of the computer 100 according to the first embodiment.

As illustrated in FIG. 2, the computer 100 includes an input device 11, a display device 12, an external interface (I/F) 13, and a random access memory (RAM) 14. Further, the computer 100 includes a read only memory (ROM) 15, a central processing unit (CPU) 16, a communication interface (I/F) 17, and a hard disc drive (HDD) 18. These hardware devices are connected to one another via a bus B.

The input device 11 includes a keyboard, a mouse, and/or a touch panel enabling an input of various operation instructions. The display device 12 includes a display on which results of processing by the computer 100 are displayed. It should be noted that the input device 11 and the display device 12 are not necessarily constantly connected to the bus B. In other words, at least one of the input device 11 and the display device 12 could be connected to the computer 100 as necessary when used.

The communication interface 17 is an interface device to connect the computer 100 to the network N1. The computer 100 performs data communication via the communication interface 17.

The HDD 18 is a nonvolatile storage device that stores programs or data. Examples of the programs or data stored in the HDD 18 include an operating system (OS) for controlling an entire operation of the computer 100 and application software providing various functions on the OS.

The computer 100 may include, instead of the HDD 18, a drive device such as a solid state drive (SSD) that uses a flash memory as a storage medium. The HDD 18 manages the programs or data stored therein by a predetermined file system or a predetermined database.

The external interface 13 is an interface device with an external device. Examples of the external device include a storage medium 13*a*. The external interface 13 enables the computer 100 to read or write data from or to the storage medium 13*a*. Examples of the storage medium 13*a* include a flexible disc, a compact disc (CD), a digital versatile disc (DVD), a SD memory card, and a universal serial bus (USB) memory.

The ROM 15 is a nonvolatile semiconductor memory, which holds programs or data even after the computer 100 is turned off as the power is not supplied. The ROM 15 stores programs or data such as a basic input output system (BIOS), which is executed when the computer 100 is started up, OS settings, and network settings. The RAM 14 is a volatile semiconductor memory, which holds programs or data temporarily.

The CPU 16 reads programs or data from a storage device such as the ROM 15 and the HDD 18 onto the RAM 14, and executes processing to implement the entire control of the computer 100 or functions of the computer 100.

The service provision system 10 according to the present embodiment implements processes as described later with the hardware configuration of the computer 100 as illustrated in FIG. 2.

Figure 3:
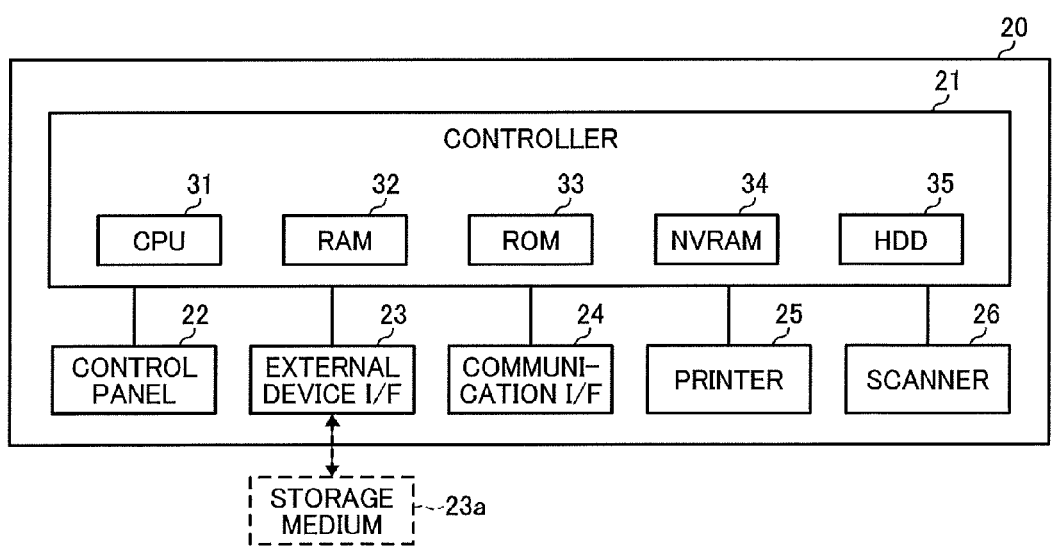
FIG. 3 is a block diagram illustrating an example hardware configuration of a device according to an embodiment of the present disclosure.

Hereinafter, a description is given of a hardware configuration of the device 20 with reference to FIG. 3, in which the device 20 is implemented by an image forming apparatus. FIG. 3 is a block diagram illustrating an example hardware configuration of the device 20 according to the first embodiment.

As illustrated in FIG. 3, the device 20 includes a controller 21, a control panel 22, an external interface (I/F) 23, a communication interface (I/F) 24, a printer 25, and a scanner 26. The controller 21 includes a CPU 31, a RAM 32, a ROM 33, a non-volatile random access memory (NVRAM) 34, and an HDD 35.

The ROM 33 is a nonvolatile semiconductor memory that stores various programs or data. The RAM 32 is a volatile semiconductor memory, which holds programs or data temporarily. The NVRAM 34 is a nonvolatile semiconductor memory that stores setting information, etc., for example. The HDD 35 is a nonvolatile storage device that stores various programs or data.

The CPU 31 is a processing device that reads programs or data from the ROM 33, the NVRAM 34, the HDD 35, etc., onto the RAM 32, and executes processing to implement the entire control of the device 20 or functions of the device 20.

The control panel 22 includes an input device that receives a user input, and a display device that displays various types of information. The external interface 23 is an interface device with an external device. Examples of the external device include a storage medium 23*a*. The external interface 23 enables the device 20 to read or write data from or to the storage medium 23*a*.

Examples of the storage medium 23*a* include an IC card, a flexible disc, a CD, a DVD, a SD memory card, and a USB memory.

The communication interface 24 is an interface device to connect the device 20 to the network N2. The device 20 performs data communication via the communication interface 24.

The printer 25 is a printing device that forms an image in accordance with print data. The scanner 26 is a reading device that scans a document to generate an electronic file (image file).

The device 20 according to the present embodiment implements processes as described later with the hardware configuration as illustrated in FIG. 3.

Figure 4:
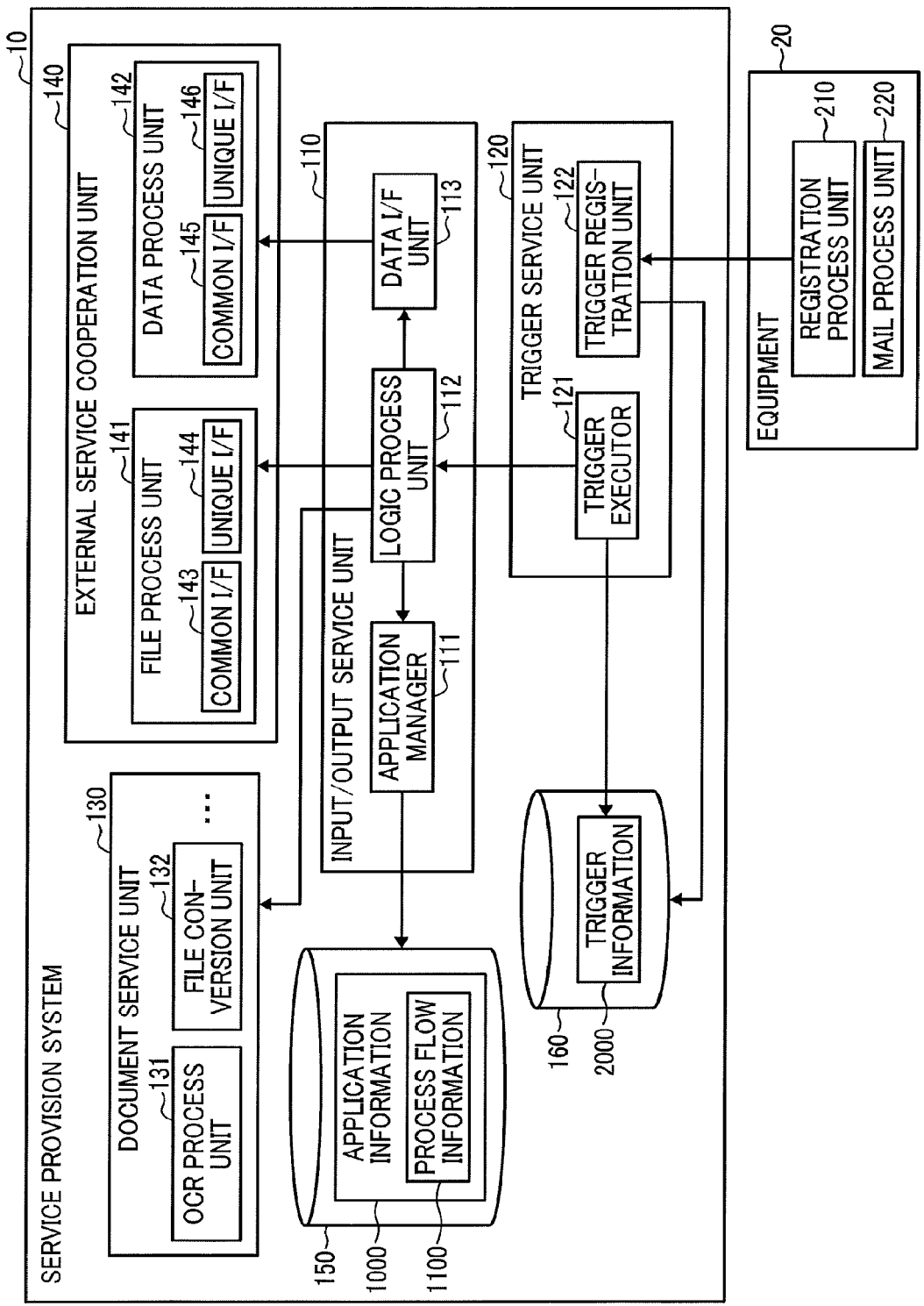
FIG. 4 is a block diagram illustrating an example functional configuration of a service provision system and the device according to an embodiment of the present disclosure.

Hereinafter, a description is given of functional configurations of the service provision system 10 and the device 20 according to the present embodiment with reference to FIG. 4. FIG. 4 is a block diagram illustrating an example functional configuration of the service provision system 10 and the device 20 according to the first embodiment.

As illustrated in FIG. 4, the service provision system 10 includes an input/output service unit 110, a trigger service unit 120, a document service unit 130, and an external service cooperation unit 140. Each of these functional blocks is implemented by processes executed by the CPU 16 according to one or more programs installed on the information processing apparatus that implements the service provision system 10.

Further, the service provision system 10 includes an application information storage unit 150 and a trigger information storage unit 160. Each of the application information storage unit 150 and the trigger information storage unit 160 is implemented by, for example, the HDD 18. Further, at least one of the application information storage unit 150 and the trigger information storage unit 160 may be implemented by a storage device that is connected to the service provision system 10 via the network N1.

The input/output service unit 110 performs processing relating to the services provided by the service provision system 10. The input/output service unit 110 includes an application manager 111, a logic process unit 112, and a data interface unit 113.

The application manager 111 manages application information 1000 stored in the application information storage unit 150. The application information 1000 is an application that provides the services. In other words, the application information 1000 provides the services provided by the service provision system 10.

Further, the application manager 111 sends process flow information 1100 contained in the application information 1000 to the logic process unit 112 in response to a request from the logic process unit 112. The process flow information 1100 is information in which a series of processes implementing the service provided by the application information 1000 is defined. This series of processes may be referred to as a "process flow" hereinafter.

The logic process unit 112 acquires the process flow information 1100 from the application manager 111 in response to a request from the trigger service unit 120. Further, the logic process unit 112 executes a process flow that implements a service based on the process flow information 1100 acquired from the application manager 111. This enables the service provision system 10 according to the present embodiment to provide the services. A detailed description is given later of the logic process unit 112.

The data interface unit 113 sends requests to the external service cooperation unit 140 in response to a request from the logic process unit 112. For example, the data interface unit 113 requests a data process unit 142 of the external service cooperation unit 140 to acquire a list of electronic files stored in the storage system 30.

The trigger service unit 120 performs processing relating to a trigger for executing the process flow. The trigger service unit 120 includes a trigger executor 121 and a trigger registration unit 122.

The trigger executor 121 requests the logic process unit 112 to execute a process flow in response to an occurrence of a predetermined event based on trigger information 2000 stored in the trigger information storage unit 160. In other words, the trigger executor 121 causes a process flow to be executed in response to the occurrence of a predetermined triggering event based on the trigger information 2000.

The trigger information 2000 is information in which a type of an event (e.g., a mail transmission and a facsimile transmission), and identification information of a process flow that is requested to be executed when the event occurs are defined.

The trigger registration unit 122 stores the trigger information 2000 in the trigger information storage unit 160 in response to a request from a registration process unit 210 of the device 20. A detailed description is given later of the registration process unit 210. Thus, the trigger for causing the process flow to be executed is registered.

The document service unit 130 performs a predetermined process contained in the process flow based on the process flow information 1100. In this disclosure, the document service unit 130 includes an OCR process unit 131 and a file conversion unit 132.

The OCR process unit 131 performs an OCR processing on an electronic file. The file conversion unit 132 converts an electronic file into a predetermined data format.

It should be noted that the document service unit 130 may further include a compression/decompression unit that compresses or decompresses an electronic file, and a print conversion unit that converts an electronic file into print data.

As described heretofore, the document service unit 130 includes various functional units that perform predetermined processes (processes using the electronic file) contained in the process flow. Accordingly, the document service unit 130 is implemented by a group of programs (modules) that provides these various functions.

The external service cooperation unit 140 sends requests to the storage system 30 in response to a request from the logic process unit 112 or the data interface unit 113. For example, the external service cooperation unit 140 requests the storage system 30 to deliver (upload) an electronic file in response to a request from the logic process unit 112.

It should be noted that, in a case in which the information processing system 1 includes a plurality of storage systems 30, the service provision system 10 includes a plurality of external service cooperation units 140, each corresponding to one of the plurality of storage systems 30. In other words, the service provision system 10 includes, for example, an external service cooperation unit 140A that sends requests to the storage system 30A, and the external service cooperation unit 140B that sends requests to the storage system 30B.

The external service cooperation unit 140 includes a file process unit 141 that accepts a request from the logic process unit 112 and the data process unit 142 that accepts a request from the data interface unit 113.

The file process unit 141 includes a common interface (I/F) 143 and a unique interface (I/F) 144, in which an application programming interface (API) for performing an operation (e.g., acquisition, storage, and edit) on an electronic file stored in the storage system 30 is defined.

The common interface 143 is an API shared and used among the plurality of storage systems 30. Examples of this API are illustrated in FIG. 5A. In other words, the common interface 143 of the file process unit 141 is a group of APIs that enables use of functions relating to file operation (e.g., acquisition (download) or delivery (upload) of an electronic file) that can be used by all of the storage systems 30.

The unique interface 144 is an API used by a specific one or ones of the storage systems 30. An example of this API is illustrated in FIG. 5B. In other words, the unique interface 144 of the file process unit 141 is a group of APIs that enables use of functions related to file operation (e.g., editing of an electronic file) that can be used by a specific one or ones of the storage systems 30.

Accordingly, the common interface 143 is defined for all of the plurality of external service cooperation units 140 in substantially the same manner. By contrast, the unique interface 144 is defined for the external service cooperation unit 140 corresponding to a specific storage system 30, in which the API defined by the unique interface 144 can be used.

Further, the data process unit 142 includes a common interface (I/F) 145 and a unique interface (I/F) 146, in which an API for acquiring metadata (e.g., a list of electronic files and a list of folders) such as bibliographic information of electronic files stored in the storage system 30.

The common interface 145 is an API shared and used among the plurality of storage systems 30. Examples of this API are illustrated in FIG. 5C. In other words, the common interface 145 of the data process unit 142 is a group of APIs that enables use of functions such as acquisition of metadata (e.g., acquisition of a list of electronic files or a list of folders) that can be used by all of the storage systems 30.

The unique interface 146 is an API used by a specific one or ones of the storage systems 30. An example of this API is illustrated in FIG. 5D. In other words, the unique interface 146 of the data process unit 142 is a group of APIs that enables use of functions such as acquisition of metadata (e.g., acquisition of a list of image files) that can be used by a specific one or ones of the storage systems 30.

Accordingly, the common interface 145 is defined to all of the plurality of external service cooperation units 140 in substantially the same manner to one another. By contrast, the unique interface 146 is defined for the external service cooperation unit 140 corresponding to a specific storage system 30, in which the API defined by the unique interface 146 can be used.

As described heretofore, the service provision system 10 according to the present embodiment includes the plurality of external service cooperation units 140, each performing processing in cooperation with each of the plurality of the storage systems 30. In a case in which the storage system 30 that is to cooperate with the service provision system 10 is added or deleted, the external service cooperation unit 140 is added or deleted in accordance with the addition or deletion of the storage system 30.

Therefore, in the service provision system 10 according to the present embodiment, influence of the addition or deletion of the storage system 30 that is to cooperate with the service provision system 10 can be localized. In other words, in the service provision system 10 according to the present embodiment, the storage system 30 that is to cooperate with the service provision system 10 is added or reduced without influencing other functional blocks such as the input/output service unit 110.

Thus, the service provision system 10 according to the present embodiment is able reduce time for development required by the addition or deletion of the storage system 30 that is to cooperate with the service provision system 10. It should be noted that a software development kit (SDK) may be used to add or delete the external service cooperation unit 140.

Further, in the external service cooperation unit 140, the common interface 143 and the unique interface 144 are respectively implemented by different modules or the like. Furthermore, the API defined by the common interface 143 and the unique interface 144 can be used by designating an external service name. In other words, "external service name" is a variable portion.

Accordingly, in the service provision system 10 according to the present embodiment, when the storage system 30 that is to cooperate with the service provision system 10 is added, the common interface 143 included another external service cooperation unit 140 is reused. In other words, in a case in which the storage system 30 that is to be cooperate with the service provision system 10 is added, only the unique interface 144 needs to be developed.

Thus, the service provision system 10 according to the present embodiment is further able to reduce time for development required when adding the storage system 30 that is to cooperate with the service provision system 10. The same applies to the common interface 145 and the unique interface 146.

Although in the present embodiment a description is given, not limited thereto, in which the service provision system 10 includes the external service cooperation unit 140 that sends requests to the storage system 30. For example, the service provision system 10 may include, for example, the external service cooperation unit 140 that sends requests to the mail system 40 and/or the external service cooperation unit 140 that sends requests to the facsimile system 50. In other words, the service provision system 10 according to the present embodiment may include a plurality of external service cooperation units 140, each sending requests to each of the plurality of systems that provide different external services.

The application information storage unit 150 stores the application information 1000. The application information 1000 stored in the application information storage unit 150 is associated with an application name that identifies the application information 1000 (application). It should be noted that the application information 1000 may be stored in the application information storage unit 150 in association with an application ID that identifies the application information 1000.

The application information 1000 contains the process flow information 1100. For example, the application information 1000 that provides the OCR delivery service contains the process flow information 1100 in which a series of processes (process flow) for implementing the OCR delivery service is defined.

It should be noted that the application information 1000 may contain two or more pieces of the process flow information 1100. Further, the application information storage unit 150 may store the process flow information 1100 that is not contained in the application information 1000.

As described above, the process flow information 1100 is information in which a series of processes implementing the service provided by the application information 1000 is defined. A detailed description is given later of the process flow information 1100.

The trigger information storage unit 160 stores the trigger information 2000. As described above, the trigger information 2000 is information in which the type of event and the identification information of a process flow that is requested to be executed when the event occurs are defined. In other words, the trigger information 2000 is information in which the type of event and the identification information of the process flow information 1100 are defined. A detailed description is given later of the trigger information 2000.

As illustrated in FIG. 4, the device 20 includes the registration process unit 210 and a mail process unit 220.

Each of these functional blocks is implemented by processes executed by the CPU 31 according to one or more programs installed on the device 20.

The registration process unit 210 registers a trigger with the service provision system 10. In other words, the registration process unit 210 generates the trigger information 2000 and stores the generated trigger information 2000 in the trigger information storage unit 160 of the service provision system 10 for registration.

The mail process unit 220 generates an email to which an electronic file is attached, and transmits the generated mail to an email address designated to the mail. For example, in a case in which the mail address designated to the generated mail is a domain name of the mail service provided by the mail system 40, the mail process unit 220 transmits the generated mail to the mail system 40.

A user of the device 20 according to the present embodiment sends an email to a predetermined mail address using the mail process unit 220 to use the OCR delivery service using the electronic file attached to the mail.

Figure 6:
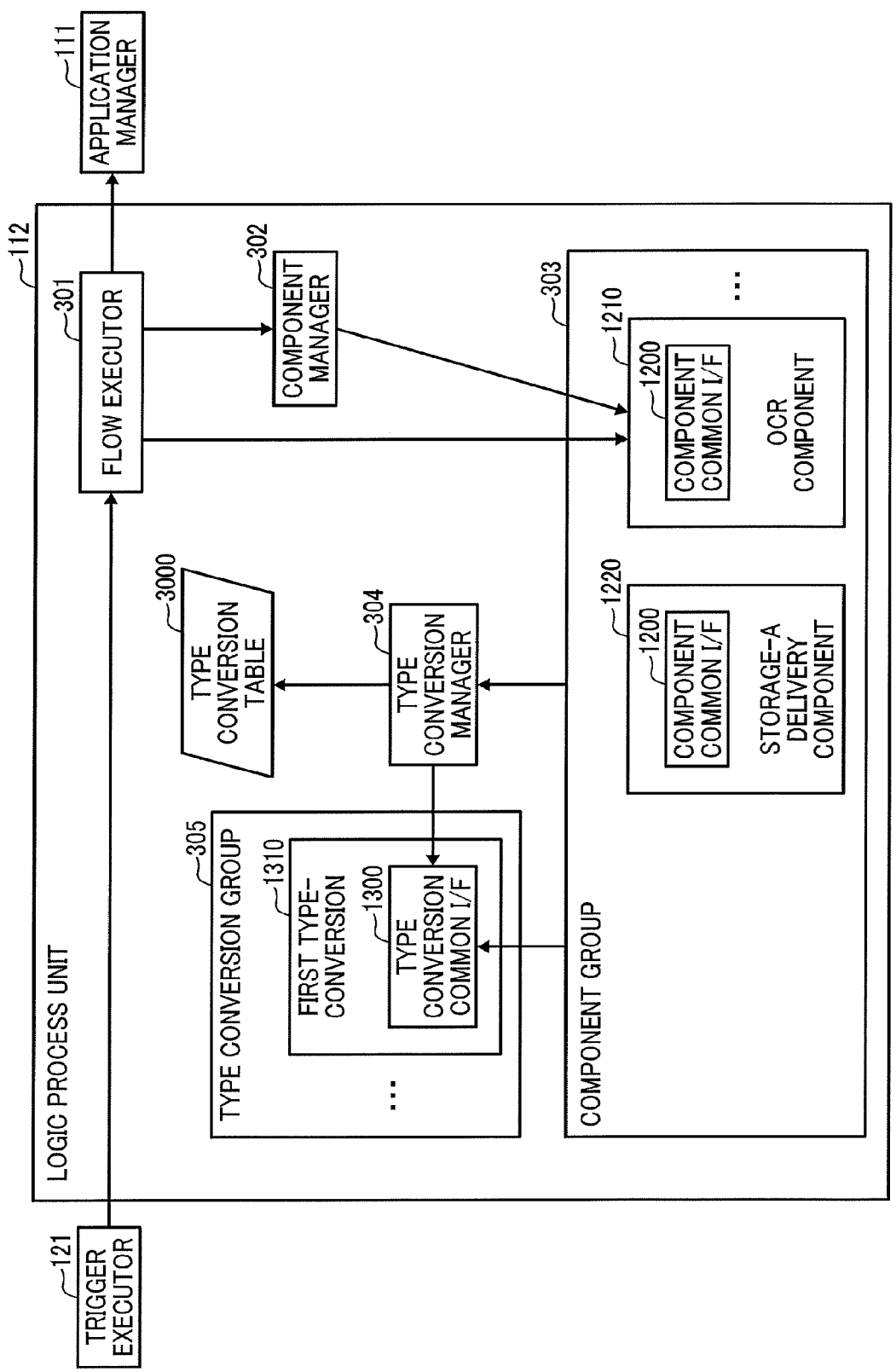
FIG. 6 is a block diagram illustrating an example functional configuration of a logic process unit according to an embodiment of the present disclosure.

Hereinafter, a description is given in detail of a functional configuration of the logic process unit 112 with reference to FIG. 6. FIG. 6 is a block diagram illustrating an example functional configuration of the logic process unit 112 according to the first embodiment.

As illustrated in FIG. 6, the logic process unit 112 includes a flow executor 301, a component manager 302, a component group 303, a type conversion manager 304, and a type conversion group 305. Further, the logic process unit 112 includes a type-conversion information table 3000.

The flow executor 301 acquires, from the application manager 111, the process flow information 1100 contained in application information 1000, in response to a request from the trigger executor 121. Further, the flow executor 301 executes a series of processes (process flow) based on the process flow information 1100 acquired from the application manager 111.

The series of processes based on the process flow information 1100 are executed by combining components, each being provided for executing each process contained in the series of processes. It should be noted that the component is implemented by a program, a module, and the like that provides a predetermined function. The component is defined by, for example, a class or a function.

The component manager 302 manages the components. Specifically, the component manager 302 generates a component in response to a request from the flow executor 301 and transmits the generated component to the flow executor 301. In this disclosure, the generation of the component means expanding the component defined by, for example, a class or a function to a memory such as the RAM 14.

The component group 303 is a set of components. The component group 303 includes an OCR component 1210 and a storage-A delivery component 1220.

The OCR component 1210 is a component for performing an OCR processing on an electronic file. Specifically, the OCR component 1210 performs an OCR processing on an electronic file using the OCR process unit 131 of the document service unit 130.

The storage-A delivery component 1220 is a component for delivering (uploading) an electronic file to the storage system 30A corresponding to the external service name "Storage A". Specifically, the storage-A delivery component 1220 uses the external service cooperation unit 140 corresponding to the storage system 30A corresponding to the external service name "Storage A" to deliver the electronic file to the storage system 30.

The component group 303 further includes other components such as a conversion component for converting a data format of an electronic file and a compression component for compressing an electronic file.

Further, each component of the component group 303 includes a component common interface (I/F) 1200. The component common interface 1200 is an API defined for each component in common, and includes an API for generating a component and an API for executing processing of a component.

As each component includes the component common interface 1200, influence of the addition or deletion of a component is localized. In other words, any component is added or deleted without influencing the flow executor 301 or the component manager 302, for example. Thus, the service provision system 10 according to the present embodiment is able reduce time for development required by the addition or deletion of a predetermined function (i.e., the addition or deletion of a component that performs processing implementing the function), etc.

The type conversion manager 304 manages a type conversion of a data type. A data type that can be handled by each component is determined in advance. For this reason, in response to a request from the component, the type conversion manager 304 refers to the type-conversion information table 3000 as illustrated in FIG. 7 to generate a type conversion contained in the type conversion group 305.

Further, the type conversion manager 304 requests the generated type conversion to perform type conversion processing. The type conversion is implemented by a program or a module for executing a type conversion processing of a data type. The type conversion is defined by, for example, a class or a function. In addition, the generation of the type conversion means expanding the type conversion defined by, for example, a class or a function to a memory such as the RAM 14.

Examples of the data type include a data type "InputStream" indicating stream data, "LocalFilePath" indicating a path (address) of an electronic file stored in the storage device, etc., and "File" indicating an entity of an electronic file.

Hereinafter, a description is given in detail of the type-conversion information table 3000 with reference to FIG. 7. FIG. 7 is a view illustrating an example of the type-conversion information table 3000.

As illustrated in FIG. 7, the type-conversion information table 3000 includes, as data items, a data type before conversion, a data type after conversion, and a type conversion to be generated. In other words, type conversion information stored in the type-conversion information table 3000 illustrated in FIG. 7 associates each set of the data type before conversion and the data type after conversion with a type conversion for converting the data type before conversion to the data type after conversion.

The type conversion group 305 is a set of type conversions. The type conversion group 305 includes a first type-conversion 1310 for converting the data type "InputStream" to "LocalFilePath". The type conversion group 305 includes other type-conversion such as a second type-conversion for converting the data type "LocalFilePath" to "FILE".

Further, each of the type conversions included in the type conversion group 305 includes a type conversion common interface 1300. The type conversion common interface 1300 is an API defined for each type conversion in common, including an API for generating a type conversion and an API for performing type conversion processing of the type conversion.

As each type conversion includes the type conversion common interface 1300, influence of the addition or deletion of a type conversion is localized. In other words, any type conversion is added or deleted without influencing the type conversion manager 304, etc. Thus, the service provision system 10 according to the present embodiment is able reduce time for development required by the addition or deletion of the type conversion.

Hereinafter, a description is given of the process flow information 1100 contained in the application information 1000 that provides the OCR delivery service, with reference to FIG. 8. FIG. 8 is a view illustrating an example of the process flow information 1100.

The process flow information 1100 illustrated in FIG. 8 is information in which a series of processes (processing flow) that implements the OCR delivery service is defined.

The process flow information 1100 illustrated in FIG. 8 includes a flow name 1101 and flow details 1102. The flow name 1101 identifies the process flow information 1100. The flow details 1102 define a content of each of the processes contained in the process flow.

For the flow name 1101, a flow name "OCR delivery" that identifies the process flow information 1100 illustrated in FIG. 8 is defined.

The flow details 1102 includes process definitions 1103 and 1104, each defining a content of each process contained in the process flow. Each of the process definitions 1103 and 1104 contains "componentName" indicating a name of a component for performing the process and "parameters" indicating parameters for the component.

Specifically, for the "componentName" of the process definition 1103, an "OCR component" indicating that the process is executed by the OCR component 1210 is defined. Further, for the "parameters" of the process definition 1103, parameters "language" and "ouputType" for the OCR component 1210 are defined.

For the parameter "language", a language of OCR processing is defined. For the parameter "outputType", a data format of an electronic file obtained by the OCR processing is defined.

In substantially the same manner, for the "componentName" of the process definition 1104, a "Storage-A delivery component" indicating that the process is executed by the storage-A delivery component 1220 is defined. Further, for the "parameters" of the process definition 1104, a parameter "folderID" for the storage-A delivery component 1220 is defined.

For the parameter "folderID", a folder ID of a folder in which an electronic file is to be stored in the storage system 30A corresponding to the external service name "Storage A" is defined.

As described heretofore, in the process flow information 1100, the components that respectively execute the processes and the parameters for the components are defined. This enables the service provision system 10 according to the present embodiment to cause each component defined in the process flow information 1100 to be executed to execute the series of processes (process flow).

It should be noted that, in the process flow according to the process flow information 1100 illustrated in FIG. 8, the components defined in the process definitions 1103 and 1104 are executed in order from the top. In other words, an order of execution is defined such that the components are executed in order from the top. However, this is just an example, and in the process flow information 1100, any suitable desired order of execution of the components defined in the process definitions 1103 and 1104 may be defined.

Figure 9:
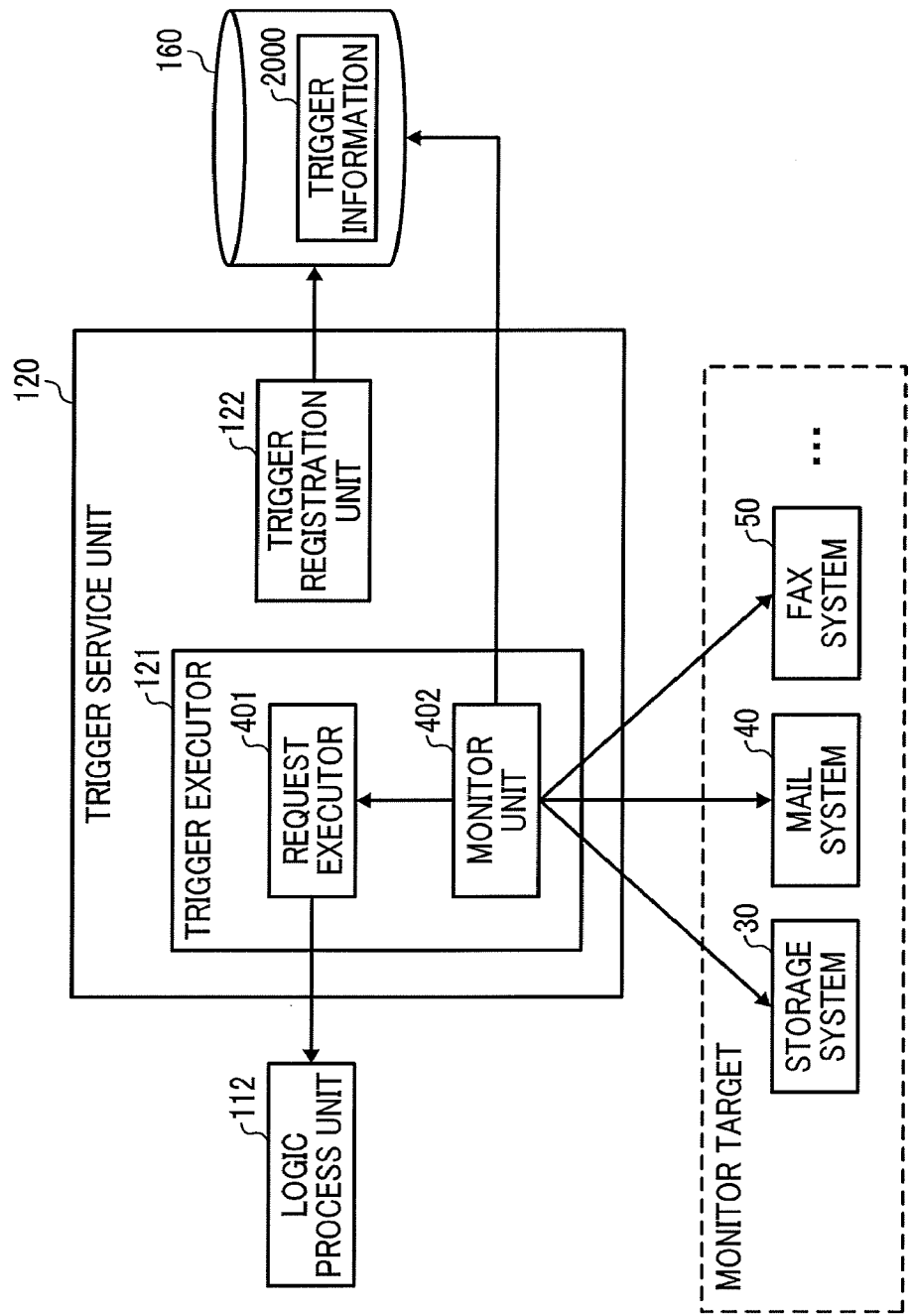
FIG. 9 is a block diagram illustrating an example functional configuration of a trigger service unit according to an embodiment of the present disclosure.

Hereinafter, a description is given in detail of the trigger service unit 120, with reference to FIG. 9. FIG. 9 is a block diagram illustrating an example functional configuration of the trigger service unit 120 according to the first embodiment.

As illustrated in FIG. 9, the trigger executor 121 of the trigger service unit 120 includes a request executor 401 and a monitor unit 402.

The monitor unit 402 monitors a monitoring target such as the storage system 30, the mail system 40 and the facsimile system 50 to check whether a predetermined event has occurred based on the trigger information 2000 stored in the trigger information storage unit 160.

For example, the monitor unit 402 monitors the mail system 40 to determine whether an email has been sent from the device 20. In other words, the monitor unit 402 monitors the mail system 40 to determine whether there is a newly arrived mail in the mail system 40. Further, for example, the monitor unit 402 monitors the storage system 30, to determine whether the device 20 has stored a file in a predetermined folder. Furthermore, for example, the monitor unit 402 monitors the facsimile system 50 to determine whether the device 20 has performed facsimile transmission.

In response to the determination that the predetermined event has occurred, the monitor unit 402 requests the request executor 401 to execute the process flow based on the trigger information 2000.

Figures 10, 11:
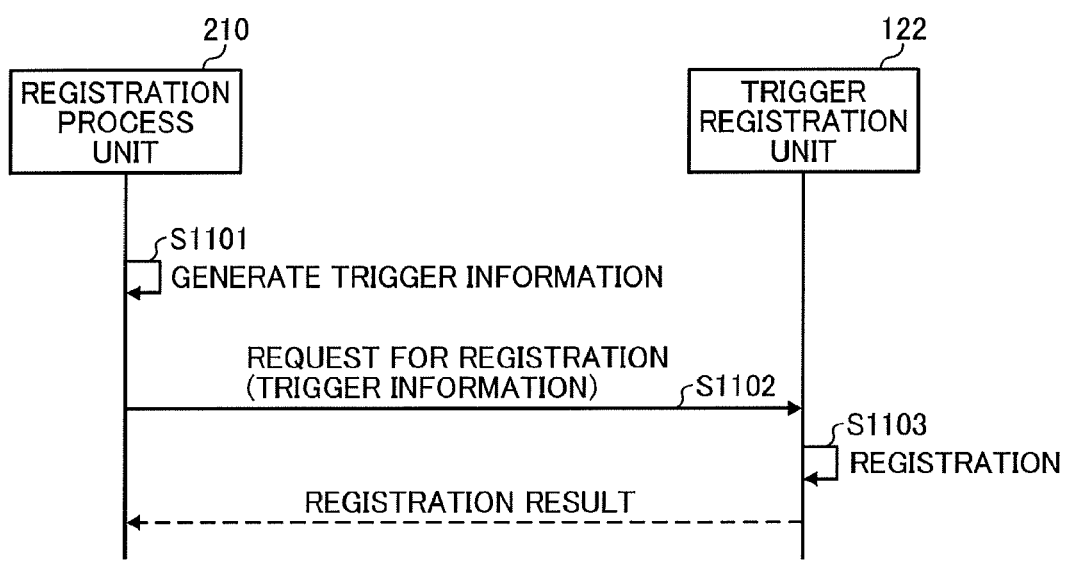
FIG. 10 is a view illustrating an example of trigger information according to an embodiment of the present disclosure.
FIG. 11 is a sequence diagram illustrating steps in an operation of registering a trigger according to an embodiment of the present disclosure.

Hereinafter, a description is given of the trigger information 2000 that triggers the execution of the process flow that implements the OCR delivery service in response to mail transmission to the predetermined mail address, with reference to FIG. 10. FIG. 10 is a view illustrating an example of the trigger information 2000.

The trigger information 2000 illustrated in FIG. 10 includes a trigger ID 2001, a trigger type 2002, an option 2003, an execution condition 2004, and a flow name 2005.

The trigger ID 2001 is identification information for identifying the trigger information 2000. In the trigger information 2000 illustrated in FIG. 10, the trigger ID "t001" is defined.

The trigger type 2002 is a type of an event as a trigger. In the trigger information 2000 illustrated in FIG. 10, "MAIL" is defined indicating that mail transmission is set as a trigger. It should be noted that "FILE STORAGE" may be defined for the trigger type 2002 indicating that file storage in a predetermined folder is set as a trigger. Further, "FACSIMILE TRANSMISSION" may be defined for the trigger type 2002 indicating that facsimile transmission is set as a trigger.

The option 2003 is information for specifying a monitoring target for each trigger type 2002. In the trigger information 2000 illustrated in FIG. 10, "abc@xyz.co.jp" is defined for "address" representing an email address.

This enables a user of the device 20 to use the OCR delivery service by transmitting an email to "abc@xyz.co.jp". Further, in response to the determination that a new mail addressed to "abc@xyz.co.jp" has arrived, the monitor unit 402 requests to the request executor 401 to execute the process flow implementing the OCR delivery service.

In a case in which "FILE STORAGE" is defined for the trigger type 2002, "folderid", for example, indicating a folder in which a file is to be stored is defined for the option 2003. Further, in a case in which the "FILE TRANSMIS- SION" is defined for the trigger type 2002, "number", for example, indicating a phone number as a facsimile transmission destination is defined for the option 2003.

For the execution condition 2004, a condition for executing the processing flow in response to an occurrence of an event defined by the trigger type 2002 is defined. In the trigger information 2000 illustrated in FIG. 10, "immediately", indicating that the process flow is to be executed immediately, is defined for "when", indicating execution timing.

For "when" as the execution condition 2004, "delay" may be defined, indicating that the process flow is to be executed in a predetermined period of time. Alternatively, "times" may be defined indicating that the process flow is to be executed in a case in which an event defined for the trigger type 2002 has occurred a predetermined number of times.

For the flow name 2005, a flow name of the process flow information 1100 is defined. In the trigger information 2000 illustrated in FIG. 10, a flow name "OCR DELIVERY" of the process flow information 1100 for implementing the OCR delivery service is defined.

This enables the service provision system 10 according to the present embodiment to execute the process flow that implements the OCR delivery service, in a case in which the device 20 sends an email to "abc@xyz.co.jp", using an electronic file attached to the mail.

In response to the request for execution of the process flow from the monitor unit 402, the request executor 401 determines whether the execution condition defined in the trigger information 2000 is satisfied. Further, depending on the execution condition, the request executor 401 requests the logic process unit 112 to perform the process flow based on the process flow information 1100 corresponding to the flow name defined in the trigger information 2000.

As described heretofore, the service provision system 10 according to the present embodiment includes the trigger service unit 120 that enables the service provision system 10 to execute various process flows in response to an occurrence of various events as a trigger. Accordingly, a user of the device 20 is able to use various services provided by the service provision system 10 by transmission of an email to a predetermined mail address, transmission of a facsimile to a predetermined phone number, and storage of a file in a predetermined folder, for example.

Hereinafter, a description is given in detail of an operation performed by the information processing system 1 according to the first embodiment.

First, a description is given of steps in an operation of registering a trigger to the service provision system 10 from the device 20 in accordance with a user instruction, with reference to FIG. 11. FIG. 11 is a sequence diagram illustrating steps in an operation of registering a trigger according to the first embodiment. Hereinafter, a description is given of an example in which the trigger information 2000 illustrated in FIG. 10 is registered to the service provision system 10.

The registration process unit 210 of the device 20 generates the trigger information 2000 illustrated in FIG. 10 (S1101). Specifically, the registration process unit 210 generates the trigger information 2000 based on various information such as the mail address, the execution condition, the flow name of the process flow information 1100 that are set in advance. Alternatively, the registration process unit 210 may generate the trigger information 2000 based on various information that is input by a user of the device 20. It should be noted that the registration process unit 210 may generate the trigger information 2000 in a data format such as JavaScript Object Notion (JSON).

After the generation of the trigger information 2000 illustrated in the FIG. 10, the registration process unit 210 of the device 20 sends a request for registration of a trigger to the service provision system 10 (S1102). The request for registration of the trigger contains the trigger information 2000 illustrated in FIG. 10.

In response to receiving the request for registration of the trigger, the trigger registration unit 122 of the service provision system 10 stores the trigger information 2000 contained in the registration request in the trigger information storage unit 160 (S1103). With this operation, the trigger information 2000 illustrated in FIG. 10 is registered to the service provision system 10.

Subsequently, the trigger registration unit 122 of the service provision system 10 sends a registration result to the device 20.

Thus, in the information processing system 1 according to the present embodiment, the trigger information 2000 generated in the device 20 is registered to the service provision system 10. This enables the service provision system 10 according to the present embodiment to execute the processing flow the implements various services in response to the occurrence of a predetermined triggering event.

Hereinafter, a description is given of steps in an operation performed in a case in which the OCR service is used in response to transmission of an email to a predetermined mail address from the device 20.

Figure 12:
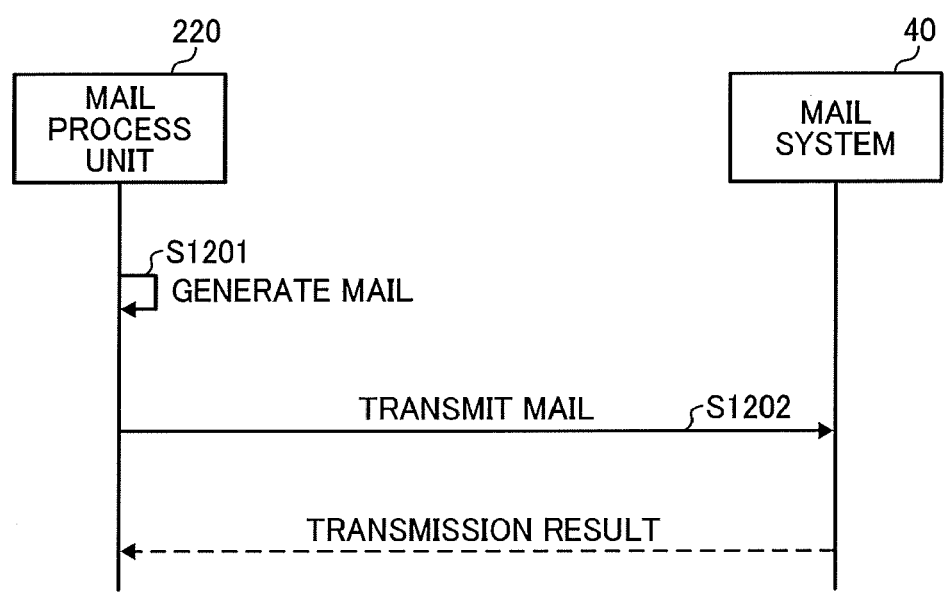
FIG. 12 is a sequence diagram illustrating a part (1/2) of steps in an operation of utilizing a service according to an embodiment of the present disclosure.

First, a description is given of steps in an operation of transmitting an email to a predetermined mail address from the device 20, with reference to FIG. 12. FIG. 12 is a sequence diagram illustrating a part (1/2) of steps in an example operation of utilizing a service according to the first embodiment.

The mail process unit 220 of the device 20 generates an email to which an electronic file is attached (S1201). Specifically, it is assumed that the mail process unit 220 generates the mail designating "abc@zyz.co.jp" as a destination.

It should be noted that the mail process unit 220 may generate the mail to which an electronic file specified by the user is attached. Further, in a case in which the device 20 is an image forming apparatus, the mail process unit 220 may generate an email to which is attached an electronic file (image file) obtained by scanning a document with the scanner 26.

After the generation of the mail, the mail process unit 220 transmits the mail to the mail system 40 based on the mail address "abc@xyz.co.jp" that is designated as a destination (S1202). Subsequently, the mail process unit 220 receives a transmission result from the mail system 40. As described heretofore, what a user of the device 20 has to do to use a service provided by the service provision system 10 is to transmit an email to which an electronic file or the like is attached to an email address that is specified in advance, for example.

Although in the above a description is given of an example in which the mail process unit 220 that is implement by an electronic mail client application installed in the device 20 generates and transmits the mail at S1201 and S1202, the mail process unit 220 is not limited thereto. For example, the mail process unit 220 of the device 20 may be implemented by executing JavaScript (registered trademark) received from the service provision system 10 on a web browser.

In other words, a web browser installed in the device 20 acquires, from the service provision system 10, screen information 4100 illustrated in FIG. 13A and the JavaScript that executes processing for implementing the mail process unit 220. The screen information 4100 illustrated in FIG. 13A is information defining a screen in HyperText Markup Language (HTML).

The device 20 displays a mail transmission screen 4200 as illustrated in FIG. 13B using the web browser based on the screen information 4100. The mail transmission screen 4200 illustrated in FIG. 13B includes a select key 4201 and an execution key 4202. The select key 4201 is a key that enables a user to select an electronic file stored in the device 20. The execution key 4202 is a key that enables a user to instruct transmission of an email to which the selected electronic file is attached.

The user presses the select key 4201 to select the electronic file, and then presses the execution key 4202. In response to pressing of these keys, the mail process unit 220 that is implemented by execution of the JavaScript acquired from the service provision system 10 performs processing of S1201 and S1202.

As described above, in a case in which the web browser is installed in the device 20, the web browser may execute a script language such as JavaScript to implement the mail process unit 220, and the mail process unit 220 may perform generation and transmission of an email.

Hereinafter, a description is given of an operation of executing the process flow that implements the OCR delivery service by the service provision system 10 in response to, as a trigger, the mail transmission to the predetermined mail address by the device 20, with reference to FIG. 14. FIG. 14 is a sequence diagram illustrating a subsequent part (2/2) of steps in the example operation of utilizing a service according to the first embodiment.

First, the monitor unit 402 of the trigger executor 121 acquires the trigger information 2000 from the trigger information storage unit 160 (S1401). Hereinafter, a description is given assuming that, at S1401, the monitor unit 402 acquires the trigger information 2000 illustrated in FIG. 10 from the trigger information storage unit 160.

The monitor unit 402 of the trigger executor 121 checks whether a predetermined event has occurred based on the trigger information 2000 acquired at S1401 (S1402). Specifically, the monitor unit 402 sends, to the mail system 40, a request for acquisition of an email, based on the trigger type "MAIL" defined for the trigger type 2002 and the mail address "abc@xyz.co.jp" defined for the option 2003 of the trigger information 2000 illustrated in FIG. 10. In response to receiving the request, the mail system 40 sends a result of mail acquisition to the monitor unit 402.

The request for acquisition of an email contains the mail address "abc@xyz.co.jp" or a local part "abc" of the mail address, etc.

The monitor unit 402 constantly performs a process of the S1402 at a specific interval. In other words, the monitor unit 402 periodically queries the mail system 40 (performs polling) to check whether the predetermined event has occurred.

In response to receiving the result of mail acquisition, the monitor unit 402 of the trigger executor 121 checks whether a new mail addressed to the mail address "abc@xyz.co.jp" has arrived, i.e., whether a new mail is acquired (S1403).

In a case in which the monitor unit 402 of the trigger executor 121 determines that the new mail has arrived, the monitor unit 402 sends, to the request executor 401, a request for execution of the process flow (S1404). The request of execution of the process flow contains the trigger information 2000 illustrated in FIG. 10 and the electronic file attached to the mail transmitted from the mail system 40 at S1402.

In response to receiving the request for execution of the process flow, the request executor 401 of the trigger executor 121 determines whether the execution condition of the trigger information 2000 contained in the execution request is satisfied (S1405). Specifically, the request executor 401 determines that the execution condition is satisfied based on the execution timing "immediately" contained in the execution condition 2004 of the trigger information 2000 illustrated in FIG. 10.

In a case in which "delay" is defined for the execution timing contained in the execution condition 2004, the request executor 401 performs a process of the next step S1407 after an elapse of a designated period of time. In other words, in this case, the request executor 401 determines that the execution condition is satisfied after the elapse of the designated period of time.

In a case in which the request executor 401 of the trigger executor 121 determines that the execution condition is satisfied, the request executor 401 sends, to the logic process unit 112, the request for execution of the process flow (S1406). The request of execution of the process flow transmitted at S1406 contains the flow name "OCR delivery" defined for the flow name 2005 in the trigger information 2000 illustrated in FIG. 10, and the electronic file attached to the mail transmitted from the mail system 40 at S1402.

Next, in response to receiving the request for execution of the process flow, the logic process unit 112 executes the series of processes (process flow) based on the process flow information 1100 corresponding to the flow name "OCR delivery" contained in the execution request (S1407). The logic process unit 112 sends a result of execution of the process flow to the request executor 401. A detailed description is given later of the process at S1407 of executing the process flow.

With the operation described above, the service provision system 10 according to the present embodiment is able to provide the OCR delivery service in response to, as a trigger, the mail transmission from the device 20 according to a user instruction.

The processes of S1402 to S1407 are performed on each trigger information 2000. In other words, in a case in which a plurality of pieces of trigger information 2000 are stored in the trigger information storage unit 160, the service provision system 10 performs the processes of S1402 to S1407 on each of the plurality of pieces of the trigger information 2000.

In the above, with reference to FIG. 14, a description is given of an example in which the trigger type of the trigger information 2000 acquired at S1401 is "MAIL". Alternatively, in a case in which the trigger type of the trigger information 2000 is "FILE STORAGE", the monitor unit 402 checks, at S1402, whether an electronic file is stored in a predetermined folder of the storage system 30. In substantially the same manner, in a case in which the trigger type of the trigger information 2000 is "FACSIMILE TRANSMISSION", the monitor unit 402 checks, at S1402, whether a facsimile is transmitted to a predetermined phone number from the facsimile system 50.

Figure 15:
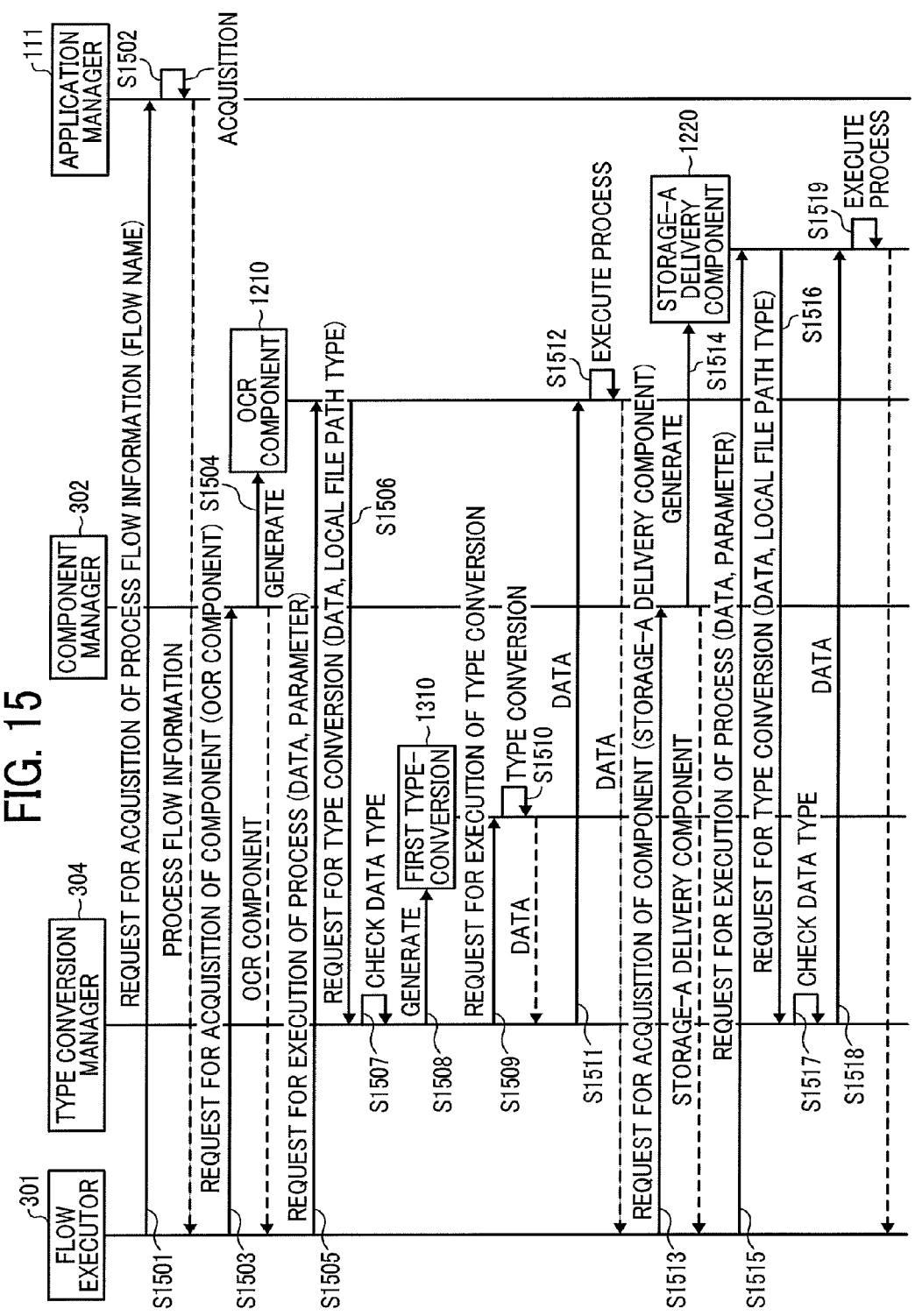
FIG. 15 is a sequence diagram illustrating steps in an operation of executing a process flow according to according to an embodiment of the present disclosure.

Hereinafter, a description is given in detail of an operation of executing the process flow at S1407 of FIG. 14, with reference to FIG. 15. FIG. 15 is a sequence diagram illustrating steps in the operation of executing the process flow according to the first embodiment. Hereinafter, a description is given of an example in which the series of processes (process flow) that implement the OCR delivery service are executed.

First, in response to receiving the request for execution of the process flow from the request executor 401, the flow executor 301 sends, to the application manager 111, a request for acquisition of the process flow information 1100 (S1501). The request for acquisition of the process flow information 1100 contains the flow name "OCR delivery".

Next, in response to receiving the request for acquisition of the process flow information 1100 from the flow executor 301, the application manager 111 acquires the process flow information 1100 corresponding to the flow name "OCR delivery" from the application information storage unit 150 (S1502). In other words, the application manager 111 acquires the process flow information 1100 illustrated in FIG. 8 from the application information storage unit 150.

The application manager 111 sends the process flow information 1100 illustrated in FIG. 8 to the flow executor 301.

Next, the flow executor 301 sends, to the component manager 302, a request for acquisition of a component based on the process flow information 1100 illustrated in FIG. 8 (S1503). The request for acquisition of the component contains the component name "OCR COMPONENT" defined in the process definition 1103 of the process flow information 1100 illustrated in FIG. 8.

Next, in response to receiving the request for acquisition of the component from the flow executor 301, the component manager 302 generates the OCR component 1210 based on the component name "OCR COMPONENT" contained in the acquisition request (S1504). It should be noted that the component manager 302 is able to generate the OCR component 1210 by using the API for generating a component defined by the component common interface 1200.

The component manager 302 sends the generated OCR component 1210 to the flow executor 301. For example, the component manager 302 may send, to the flow executor 301, an address on a memory such as the RAM 14, to which the OCR component 1210 is expanded.

Next, the flow executor 301 sends, to the OCR component 1210, a request for execution of component processing (S1505). The request of execution of the component processing contains data, a parameter value "English" of the parameter "language", and a parameter value "pdf" of the parameter "outputType", both parameter values being defined in the process definition 1103.

The data contained in the request for execution of the component processing at S1505 is the electronic file contained in the request for execution of the process flow received from the request executor 401, as the data type "InputStream". In other words, the flow executor 301 sends, to the OCR component 1210, the electronic file of the data type "InputStream" or the like, simply as data (i.e., without recognizing the data type). The electronic file or the like that is transmitted while its data type is not recognized is referred to as "data" hereinafter.

In response to receiving the request for execution of the component processing, the OCR component 1210 sends a request for conversion of the type to the type conversion manager 304 (S1506). The request for conversion of the type is referred to as a "type conversion request" hereinafter. The type conversion request contains the data and a designation of "LocalFilePath" indicating a data type that the OCR component 1210 can support.

In response to receiving the type conversion request, the type conversion manager 304 checks whether a data type of the data contained in the type conversion request matches the designated data type (S1507).

In this example, the data type of the data contained in the type conversion request is "InputStream", while the designated data type is "LocalPathFile". Accordingly, the type conversion manager 304 determines that the data type of the data contained in the type conversion request does not match the designated data type.

Based on the determination, the type conversion manager 304 refers to the type-conversion information table 3000 illustrated in FIG. 7 to generate the first type-conversion 1310 for converting the data type "InputStream" to "LocalFilePath" (S1508). It should be noted that the type conversion manager 304 is able to generate the first type-conversion 1310 by using the API for generating a type conversion defined by the type conversion common interface 1300.

After the generation of the first type-conversion 1310, the type conversion manager 304 sends a request of execution of type conversion processing to the first type-conversion 1310 (S1509). The request for execution of type conversion processing contains data of the data type "InputStream".

Next, in response to receiving the request for execution of the type conversion processing, the first type-conversion 1310 performs type conversion processing that convert the data type of the data contained in the execution request from "InputStream" to "LocalFilePath" (S1510). The first type-conversion 1310 sends the data on which the type conversion processing has been performed to the type conversion manager 304.

In response to receiving the data on which the type conversion processing has been performed, the type conversion manager 304 sends the received data to the OCR component 1210 (S1511).

In response to receiving the data from the type conversion manager 304, the OCR component 1210 performs processing on the received data using the parameter values contained in the request for execution of the component processing received at S1505 (S1512). Specifically, the OCR component 1210 causes the OCR process unit 131 of the document service unit 130 to perform OCR processing on the electronic file represented by the data while specifying "English" as an OCR language and "PDF" as an output file format.

The OCR component 1210 sends data indicating a result of the OCR processing to the flow executor 301.

Next, the flow executor 301 sends, to the component manager 302, a request for acquisition of a component based on the process flow information 1100 illustrated in FIG. 8 (S1513). The request for acquisition of the component contains the component name "STORAGE-A DELIVERY COMPONENT" defined in the process definition 1104 of the process flow information 1100 illustrated in FIG. 8.

Next, in response to receiving the request for acquisition of the component from the flow executor 301, the component manager 302 generates the storage-A delivery component 1220 based on the component name "STORAGE-A DELIVERY COMPONENT" contained in the acquisition request (S1514) It should be noted that the component manager 302 is able to generate the storage-A delivery component 1220 by using the API for generating a component defined by the component common interface 1200.

The component manager 302 sends the generated storage-A delivery component 1220 to the flow executor 301. For example, the component manager 302 may send, to the flow executor 301, an address on a memory such as the RAM 14, to which the storage-A delivery component 1220 is expanded.

Next, the flow executor 301 sends, to the storage-A delivery component 1220, a request for execution of component processing (S1515). The request of execution of the component processing contains data, and a parameter value "folderA" of the parameter "folderID" defined in the process definition 1104.

In response to receiving the request for execution of the component processing, the storage-A delivery component 1220 sends a type conversion request to the type conversion manager 304 (S1516). The type conversion request contains the data and a designation of "LocalFilePath" indicating a data type that the storage-A delivery component 1220 can support.

In response to receiving the type conversion request, the type conversion manager 304 checks whether a data type of the data contained in the type conversion request matches the designated data type (S1517).

In this example, the designated data type and the data type of the data contained in the type conversion request are both "LocalFilePath". Accordingly, the type conversion manager 304 determines that the data type of the data contained in the type conversion request matches the designated data type.

Based on the determination, the type conversion manager 304 sends the data contained in the type conversion request to the storage-A delivery component 1220 (S1518). In other words, in a case in a result of the check of the data type at S1517 indicates that the data type of the data contained in the execution request matches the designated data type, the type conversion manager 304 does not perform the generation of a type conversion.

In response to receiving the data from the type conversion manager 304, the storage-A delivery component 1220 performs processing on the received data using the parameter values contained in the request for execution of the component processing received at S1515 (S1519).

Specifically, the storage-A delivery component 1220 sends, to the external service cooperation unit 140 corresponding to the storage system 30A corresponding to the external service name "Storage A", a request for delivery of the electronic file with a designation of the folder ID "folder A".

The storage-A delivery component 1220 sends data indicating a result of the delivery processing to the flow executor 301.

With the operation described above, the service provision system 10 according to the present embodiment is able to perform an OCR processing on an electronic file and thereafter to deliver the electronic file on which the OCR processing has been performed to a designated folder in the storage system 30A of the external service name "Storage A".

As described heretofore, the service provision system 10 according to the present embodiment executes the process flow that implements various services in response to an occurrence of an event as a trigger, such as a transmission of an email to a predetermined mail address, a facsimile transmission to a predetermined phone number, a file storage to a predetermined folder. This enables a user of the device 20 according to the present embodiment to use various services provided by the service provision system 10 by, for example, transmitting an email to which an electronic file is attached to the predetermined mail address.

Second Embodiment

Hereinafter, a description is given of the information processing system 1 according to another embodiment of the present disclosure. In the second embodiment, the service provision system 10 receives a notification from a monitoring target such as the storage system 30, the mail system 40 and the facsimile system 50 in a case in which a predetermined event has occurred. Accordingly, the service provision system 10 according to the second embodiment does not have to perform polling for the monitoring target to check whether the event has occurred.

It should be noted that redundant description may be omitted below of portions having substantially the same functions as those of the first embodiment and portions performing substantially the same processes as those of the first embodiment.

Figure 16:
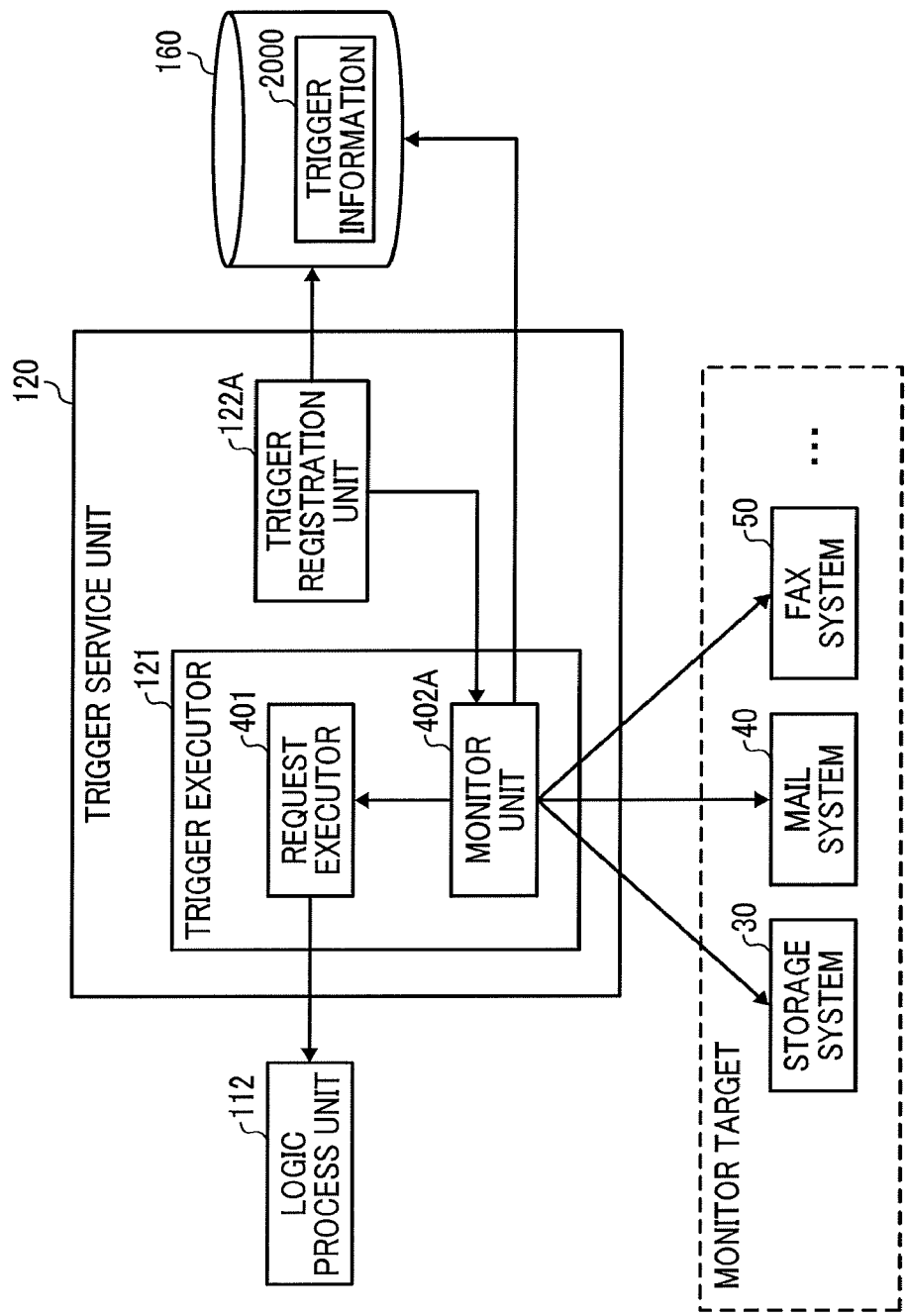
FIG. 16 is a block diagram illustrating an example functional configuration of the trigger service unit according to another embodiment of the present disclosure.

Hereinafter, a description is given of a functional configuration of the trigger service unit 120 of the service provision system 10 according to the second embodiment, with reference to FIG. 16. FIG. 16 is a block diagram illustrating an example functional configuration of the trigger service unit 120 according to the second embodiment.

The trigger service unit 120 of the service provision system 10 according to the second embodiment includes a monitor unit 402A and a trigger registration unit 122A, which are different from the first embodiment.

The trigger registration unit 122A stores the trigger information 2000 in the trigger information storage unit 160 in response to a request from the registration process unit 210 of the device 20. Further, in a case in which an event corresponding to the trigger information 2000 has occurred, the trigger registration unit 122A requests the monitor unit 402A for a registration of an event notification indicating that the event has occurred.

The monitor unit 402A sends, to the monitoring target, a request for registration of the event notification. Further, in a case in which the monitor unit 402A receives the event notification from the monitoring target, the monitor unit 402A acquires, from the trigger information storage unit 160, the trigger information 2000 corresponding to the event that has occurred. Furthermore, the monitor unit 402A requests the request executor 401 to execute the process flow based on the trigger information 2000.

Hereinafter, a description is given in detail of an operation performed by the information processing system 1 according to the second embodiment.

Figure 17:
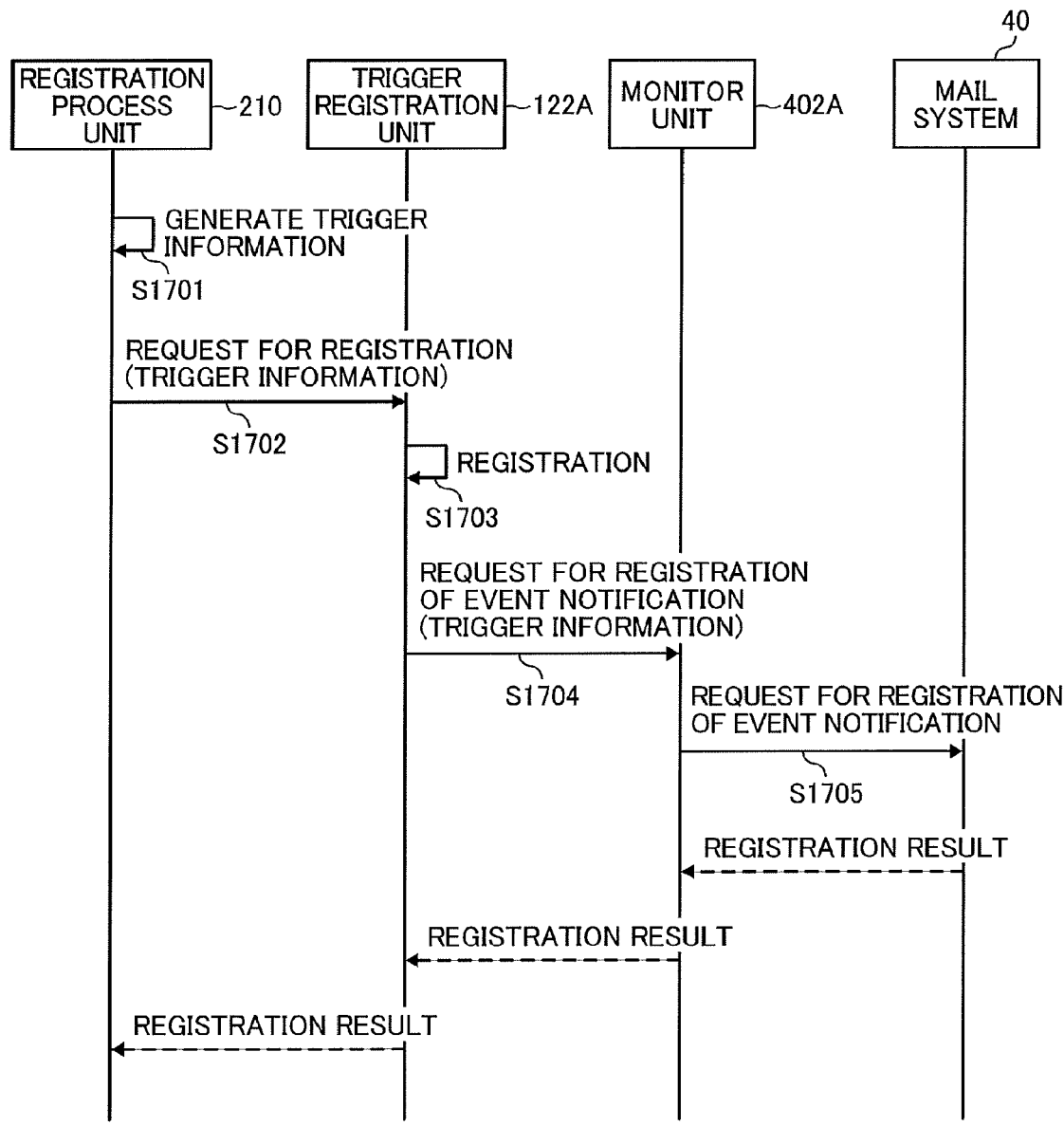
FIG. 17 is a sequence diagram illustrating an example trigger registration processing according to another embodiment of the present disclosure.

First, a description is given of steps in an operation of registering a trigger to the service provision system 10 from the device 20 in accordance with a user instruction, with reference to FIG. 17. FIG. 17 is a sequence diagram illustrating an example trigger registration processing according to the second embodiment. The processes of S1701 to S1702 in FIG. 17 are performed in substantially the similar manner as described above referring to S1101 to S1102 of FIG. 11, and the description thereof is omitted.

In response to receiving the request for registration of the trigger, the trigger registration unit 122A of the service provision system 10 stores the trigger information 2000 contained in the registration request in the trigger information storage unit 160 (S1703).

Next, the trigger registration unit 122A of the service provision system 10 sends, to the monitor unit 402A, the request for registration of the event notification (S1704). This request for registration of the event notification contains the trigger information 2000 that is stored in the trigger information storage unit 160 at S1703.

Next, the monitor unit 402A of the service provision system 10 sends the request for registration of the event notification to the monitoring target such as the mail system 40 (S1705). The monitor unit 402A sends a result of the registration to the trigger registration unit 122A. With the operation described heretofore with reference to FIG. 17, the event notification is registered to the monitoring target.

For example, in a case in which the trigger information 2000 illustrated in FIG. 10 is registered, the monitor unit 402A may send, to the mail system 40, a request for transfer of an email addressed to "abc@xyz.co.jp" to the monitor unit 402A. In other words, the monitor unit 402A may send, to the mail system 40, a request for registration of a transfer setting. Accordingly, when the monitor unit 402A receives a transferred mail, the monitor unit 402A is able to recognize that an email has been transmitted to the mail address "abc@xyz.co.jp". In other words, in response to receiving the transferred mail, the monitor unit 402A is able recognize that the event has occurred.

Further, in a case in which the trigger information 2000 in which "FILE STORAGE" is defined as the trigger type is registered, the monitor unit 402A may send, to the storage system 30, a request for registration of a transmission of an electronic file that has been stored in a predetermined folder to the monitor unit 402A. This enables the monitor unit 402A to recognize that an electronic file has been stored in the predetermined folder.

Furthermore, in a case in which the trigger information 2000 in which "FACSIMILE TRANSMISSION" is defined as the trigger type is registered, the monitor unit 402A may send, to the facsimile system 50, a request for registration of a transmission of data (electronic file) that has been sent to a predetermined phone number to the monitor unit 402A. This enables the monitor unit 402A to recognize that a facsimile has been sent to the predetermined phone number.

Figure 18:
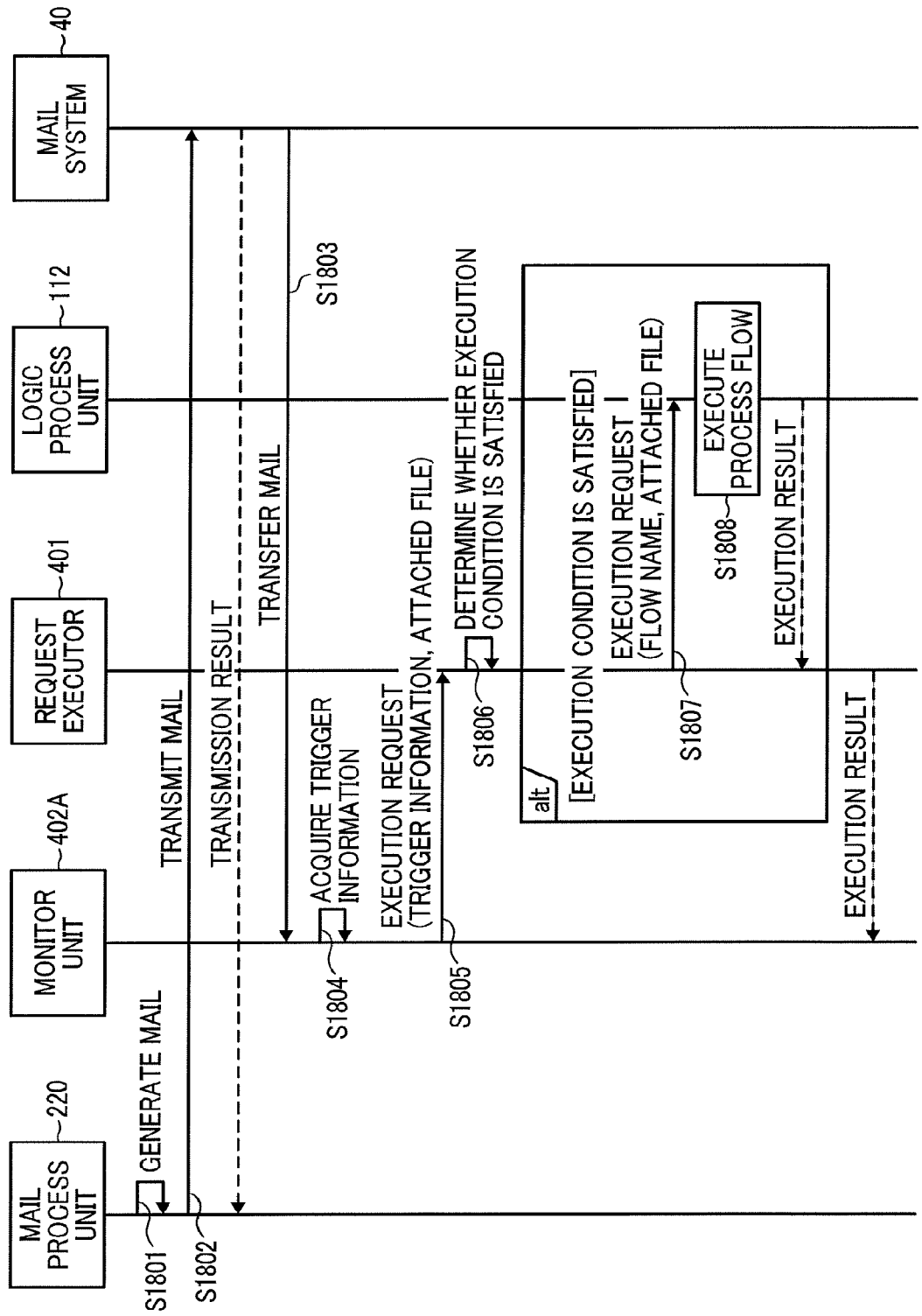
FIG. 18 is a sequence diagram illustrating steps in an operation of utilizing a service according to another embodiment of the present disclosure.

Hereinafter, a description is given of an operation performed in a case in which the OCR service is used in response to transmission of an email to a predetermined mail address from the device 20, with reference to FIG. 18. FIG. 18 is a sequence diagram illustrating steps in an example operation of utilizing a service according to the second embodiment. The processes of S1801 to S1802 in FIG. 18 are performed in substantially the similar manner as described above referring to S1201 to S1202 of FIG. 12, and the description thereof is omitted. The following description is given on the assumption that at S1705, a setting (transfer setting) for transferring an email addressed to "abc@xyz.co.jp" to the monitor unit 402A is registered to the mail system 40 in response to the registration request of the event notification from the monitor unit 402A.

The monitor unit 402A receives an email addressed to "abc@xyz.co.jp" that is transferred from the mail system 40 (S1803).

In response to receiving the mail transferred from the mail system 40, the monitor unit 402A acquires, from the trigger information storage unit 160, the trigger information 2000 corresponding to the received mail (S1804). Specifically, the monitor unit 402A acquires, from the trigger information storage unit 160, the trigger information 2000 illustrated in FIG. 10, in which the trigger type 2002 is "MAIL" and an email address contained on the option 2003 is "abc@xyz.co.jp".

It should be noted that in a case in which the mail transferred from the mail system 40 contains the trigger ID 2001, the monitor unit 402A may acquire the trigger information 2000 identified by the trigger ID 2001 from the trigger information storage unit 160.

The subsequent processes of S1805 to S1808 are performed in substantially the similar manner as described above referring to S1404 to S1407 of FIG. 14, and the description thereof is omitted.

As described above, in response to receiving the event notification from the monitoring target, the service provision system 10 according to the second embodiment acquires the trigger information 2000 corresponding to the received event notification from the trigger information storage unit 160. Accordingly, the service provision system 10 according to the present embodiment does not have to perform polling for the monitoring target to check whether the event has occurred Thus, in the service provision system 10 according to the present embodiment, a load on a network due to polling or the like is reduced.

Third Embodiment

Hereinafter, a description is given of the information processing system 1 according to still another embodiment of the present disclosure. The third embodiment is different from the first embodiment in that a user of the device 20 generates the process flow information 1100 and the trigger information 2000 by using a predetermined graphical user interface (GUI), and the generated process flow information 1100 and the generated trigger information 2000 are registered to the service provision system 10.

It should be noted that redundant description may be omitted below of portions having substantially the same functions as those of the first embodiment and portions performing substantially the same processes as those of the first embodiment.

Figure 19:
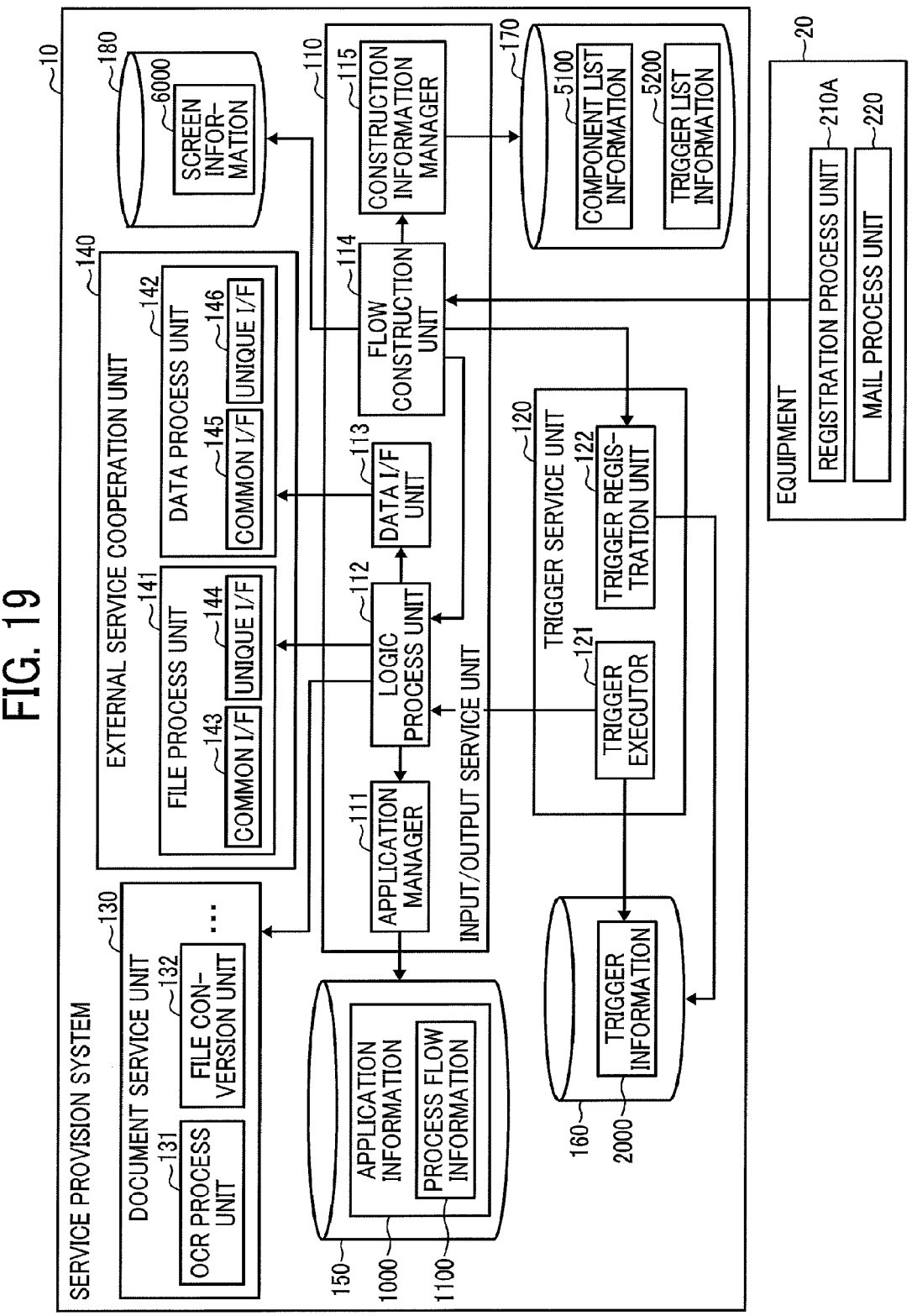
FIG. 19 is a block diagram illustrating an example functional configuration of the service provision system and the device according to still another embodiment of the present disclosure.

Hereinafter, a description is given of functional configurations of the service provision system 10 and the device 20 according to the third embodiment, with reference to FIG. 19. FIG. 19 is a block diagram illustrating example functional configurations of the service provision system 10 and the device 20 according to the third embodiment.

The input/output service unit 110 of the service provision system 10 according to the third embodiment further includes a flow construction unit 114 and a construction information manager 115.

The service provision system 10 according to the third embodiment further includes a construction information storage unit 170 and a screen information storage unit 180. Each of the construction information storage unit 170 and the screen information storage unit 180 is implemented by, for example, the HDD 18. Further, at least one of the construction information storage unit 170 and the screen information storage unit 180 may be implemented by a storage device that is connected to the service provision system 10 via the network N1.

In response to a request from the flow construction unit 114, the construction information manager 115 acquires, from the construction information storage unit 170, component list information 5100 and trigger list information 5200. Further, the construction information manager 115 sends, to the flow construction unit 114, the component list information 5100 and the trigger list information 5200 acquired from the construction information storage unit 170.

The flow construction unit 114 provides the device 20 with various screens for generating a trigger and a process flow. For example, the flow construction unit 114 provides a flow construction screen with the device 20 based on screen information 6000 stored in the screen information storage unit 180 and the component list information 5100 and the trigger list information 5200 acquired from the construction information manager 115.

Further, the flow construction unit 114 generates the process flow information 1100 and the trigger information 2000 based on the trigger and the process flow generated by using the flow construction screen.

The construction information storage unit 170 stores the component list information 5100 and the trigger list information 5200. A detailed description is given later of the component list information 5100 and the trigger list information 5200.

The screen information storage unit 180 stores the screen information 6000. The screen information 6000 is information in which various screens for generating a trigger and a process flow are defined. In the screen information 6000, the various screens are defined by HTML or Cascading Style Sheets (CSS).

The device 20 according to the third embodiment includes a registration process unit 210A, which implements a function or processing different those of the registration process unit 210 of the other embodiments. The registration process unit 210A displays various screens such as the flow construction screen based on the screen information 6000 acquired from the service provision system 10. Further, the registration process unit 210A sends, to the service provision system 10, information (flow generation information) of the trigger and the process flow generated via the flow construction screen.

Hereinafter, a description is given the component list information 5100, with reference to FIG. 20. FIG. 20 is a view illustrating an example of the component list information 5100.

The component list information 5100 illustrated in FIG. 20 includes, as data items, a component name and a parameter.

The component name is a name of the component contained in the component group 303. The parameter is a parameter for the component. In other words, the component list information 5100 illustrated in FIG. 20 is information associating the component name of each component contained in the component group 303 with the parameter.

For example, the component name "OCR COMPONENT" is associated with the parameters "language" and "ouputType". Further, the component name "STORAGE-A DELIVERY COMPONENT" is associated with the parameter "folderID".

As described above, in the component list information 5100 illustrated in FIG. 20, the component name of each component contained in the component group 303 is associated with the parameter.

Hereinafter, a description is given the trigger list information 5200, with reference to FIG. 21. FIG. 21 is a view illustrating an example of the trigger list information 5200.

The trigger list information 5200 illustrated in FIG. 21 includes, as data items, a trigger type, an option, and an execution condition.

The trigger type is a type of an event as a trigger. The option is information that is set for specifying a monitoring target for each trigger type. The execution condition is information for setting a condition for executing the process flow in response to an occurrence of the event defined by the trigger type.

For example, the trigger type "MAIL" indicates that mail transmission is set as a trigger. The trigger type "MAIL" is associated with "address" as the option and "when" as the execution condition. This association indicates that, in the trigger information 2000 whose trigger type is "MAIL", "address" indicating an email address of a destination and "when" indicating a condition for executing the process flow in response to an occurrence of the event should be set.

Further, for example, the trigger type "FAX" indicates that facsimile transmission is set as a trigger. The trigger type "FAX" is associated with "number" as the option and "when" as the execution condition. This association indicates that, in the trigger information 2000 whose trigger type is "FAX", "number" indicating a phone number of a transmission destination and "when" indicating a condition for executing the process flow in response to an occurrence of the event should be set.

Furthermore, for example, the trigger type "FILE STORAGE" indicates that storage of a file in a folder is set as a trigger. The trigger type "FILE STORAGE" is associated with "folderID" as the option and "when" as the execution condition. This association indicates that, in the trigger information 2000 whose trigger type is "FILE STORAGE", "folderID" indicating a folder in which a file is to be stored and "when" indicating a condition for executing the process flow in response to an occurrence of the event should be set.

As described above, in the trigger list information 5200 illustrated in FIG. 21, for each of the trigger types, the option and the execution condition that are required to be defined in the trigger information 2000 are associated with the trigger type.

Figure 22B:
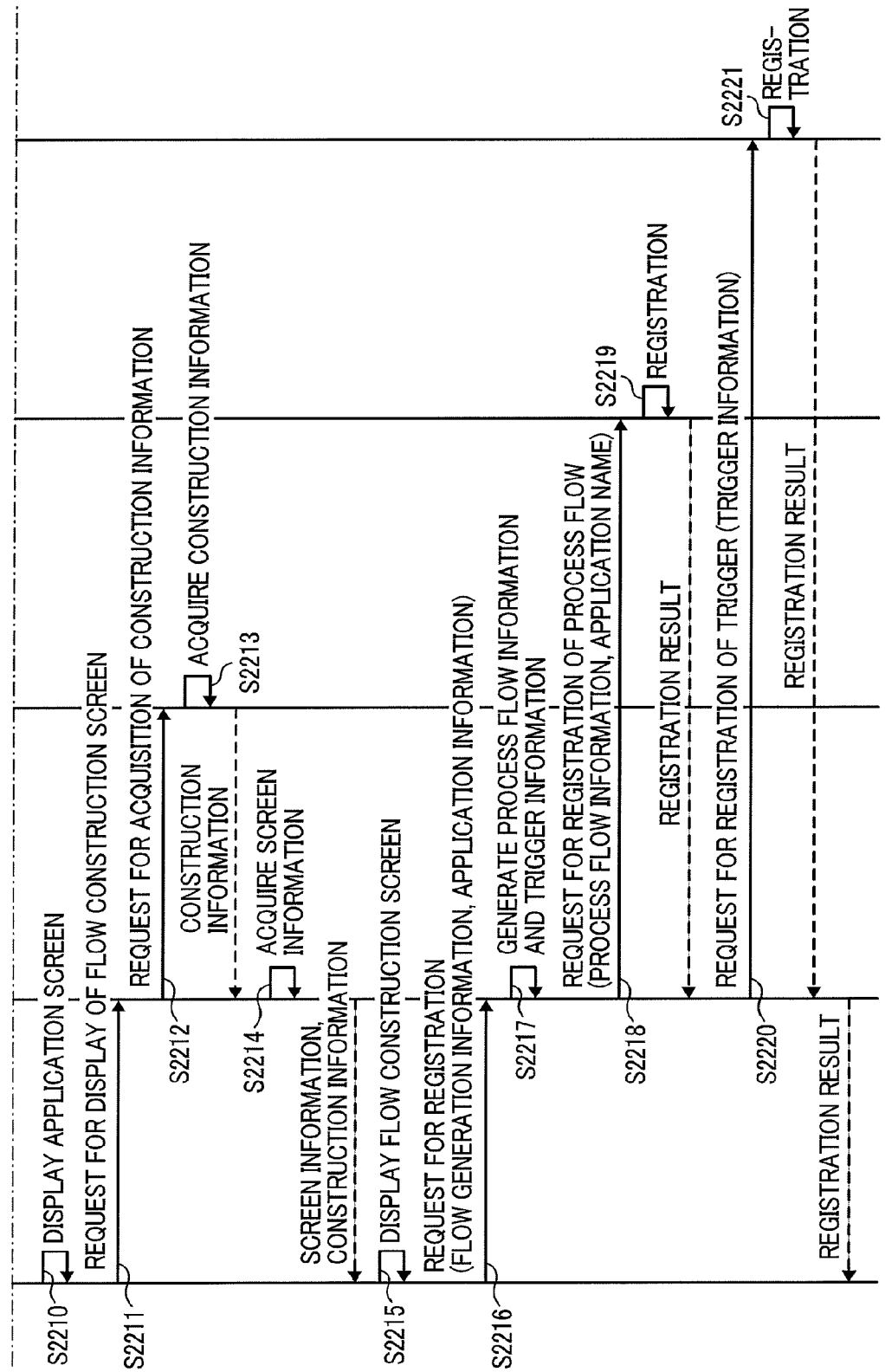

Hereinafter, a description is given in detail of an operation performed by the information processing system 1 according to the third embodiment. Specifically, a description is given of steps in an operation of generating the process flow information 1100 and the trigger information 2000 at the device 20 according to a user instruction and registering the generated process flow information 1100 and trigger information 2000 to the service provision system 10, with reference to FIGS. 22A and 22B. FIGS. 22A and 22B are a sequence diagram illustrating steps in an example operation of registering the trigger and the process flow according to the third embodiment.

First, the registration process unit 210A sends, to the input/output service unit 110 of the service provision system 10, a request for display of an application list screen (S2201). For example, the registration process unit 210A sends the request for display of the application list screen to the service provision system 10 in response to a user instruction for starting generation of the process flow, the user instruction being input via a predetermined screen.

Next, in response to receiving the request for display of the application list screen, the flow construction unit 114 of the input/output service unit 110 sends a request for acquisition of an application list to the application manager 111 (S2202).

Next, the application manager 111 acquires the application name of each piece of the application information 1000 stored in the application information storage unit 150 (S2203). The application manager 111 sends, to the flow construction unit 114, application list information indicating a list of the acquired application names.

In response to receiving the application list information, the flow construction unit 114 acquires the screen information 6000 of the application list screen from the screen information storage unit 180 (S2204). Further, the flow construction unit 114 sends, to the registration process unit 210A, the screen information 6000 of the application list screen and the application list information.

Figure 23:
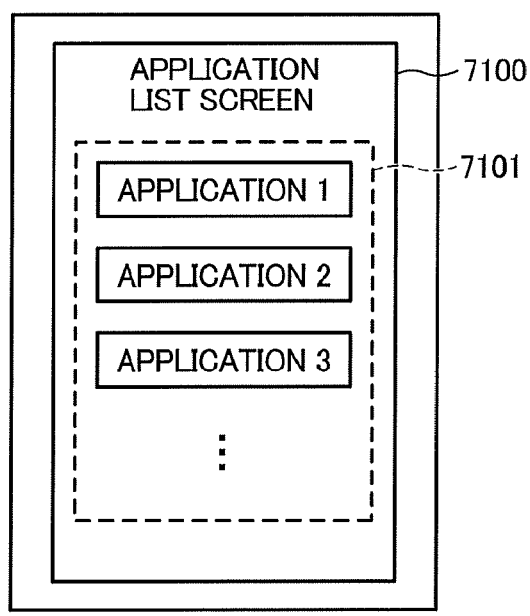
FIG. 23 is a view illustrating an example of an application list screen according to still another embodiment of the present disclosure.

The registration process unit 210A displays an application list screen 7100 as illustrated in FIG. 23, for example, based on the received screen information 6000 and application list information (S2205).

The application list screen 7100 illustrated in FIG. 23 includes an application name list 7101 listing one or more application names of the application information 1000 stored in the application information storage unit 150.

In response to a user selection of a desired application name from the application name list 7101 on the application list screen 7100 illustrated in FIG. 23, the registration process unit 210A accepts this selection operation. The following description is given on the assumption that the application name "APPLICATION 1" is selected by a user from the application name list 7101.

Next, the registration process unit 210A sends, to the input/output service unit 110 of the service provision system 10, a request for display of an application screen (S2206). The request for display of the application screen contains the application name "APPLICATION 1" selected by the user from the application name list 7101 on the application list screen 7100 illustrated in FIG. 23.

In response to receiving the request for display of the application screen, the flow construction unit 114 of the input/output service unit 110 sends a request for acquisition of a flow list to the application manager 111 (S2207). The request for acquisition of the flow list contains the application name "APPLICATION 1" selected by the user.

Next, the application manager 111 acquires the application information 1000 identified by the application name "APPLICATION 1" contained in the request for acquisition of the flow list received from the flow construction unit 114. Further, the application manager 111 acquires the flow name of the process flow information 1100 contained in the acquired application information 1000 (S2208). Further, the application manager 111 sends, to the flow construction unit 114, flow list information indicating a list of the acquired flow names.

In response to receiving the flow list information, the flow construction unit 114 acquires the screen information 6000 of the application screen from the screen information storage unit 180 (S2209). Further, the flow construction unit 114 sends, to the registration process unit 210A, the screen information 6000 of the application screen and the flow list information.

Figure 24:
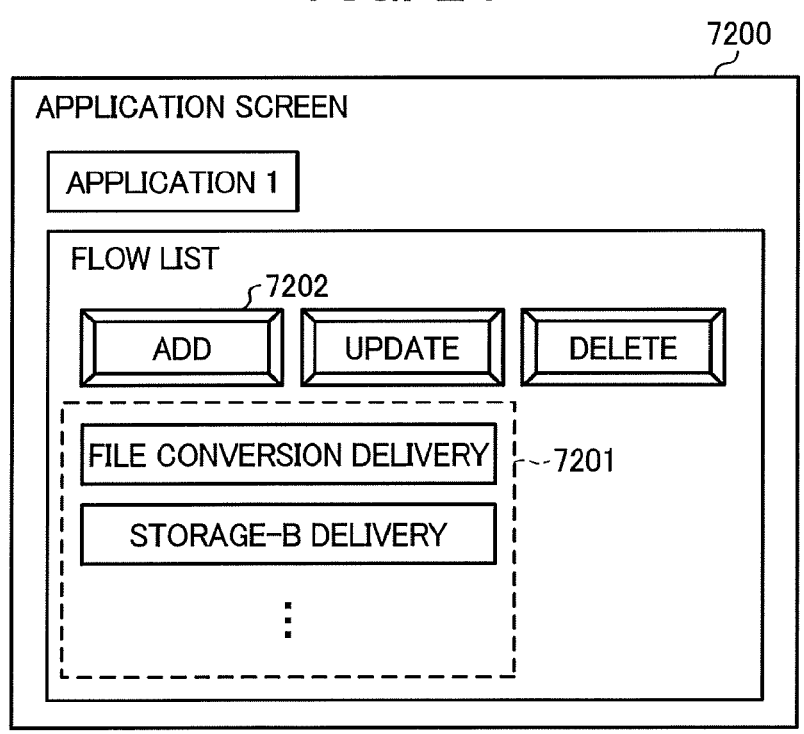
FIG. 24 is a view illustrating an example of an application screen according to still another embodiment of the present disclosure.

The registration process unit 210A displays an application screen 7200 as illustrated in FIG. 24, for example, based on the received screen information 6000 and flow list information (S2210).

The application screen 7200 illustrated in FIG. 24 includes a flow name list 7201 listing one or more flow names of the process flow information 1100 contained in the application information 1000 identified by the application name "APPLICATION 1" and an addition key 7202 for adding the process flow information 1100 to the application information 1000. The application screen 7200 illustrated in FIG. 24 further includes an update key for updating (editing) the process flow information 1100 contained in the application information 1000 identified by the application name "APPLICATION 1" and a deletion key for deleting the process flow information 1100 contained in the application information 1000.

In response to a user selection of the addition key 7202 on the application screen 7200 illustrated in FIG. 24, the registration process unit 210A accepts this selection operation. Next, the registration process unit 210A sends, to the input/output service unit 110 of the service provision system 10, a request for display of the flow construction screen (S2211).

In response to receiving the request for display of the flow construction screen, the flow construction unit 114 of the input/output service unit 110 sends a request for acquisition of construction information to the construction information manager 115 (S2212).

In response to receiving the request for acquisition of the construction information, the construction information manager 115 acquires the component list information 5100 and the trigger list information 5200 from the construction information storage unit 170 (S2213). Further, the construction information manager 115 sends the acquired component list information 5100 and trigger list information 5200 to the flow construction unit 114. It should be noted that the component list information 5100 and the trigger list information 5200 may be referred to as the "construction information" hereinafter.

In response to receiving the construction information, the flow construction unit 114 acquires the screen information 6000 of the flow construction screen from the screen information storage unit 180 (S2214). Further, the flow construction unit 114 sends, to the registration process unit 210A, the screen information 6000 of the flow construction screen and the construction information.

Figure 25:
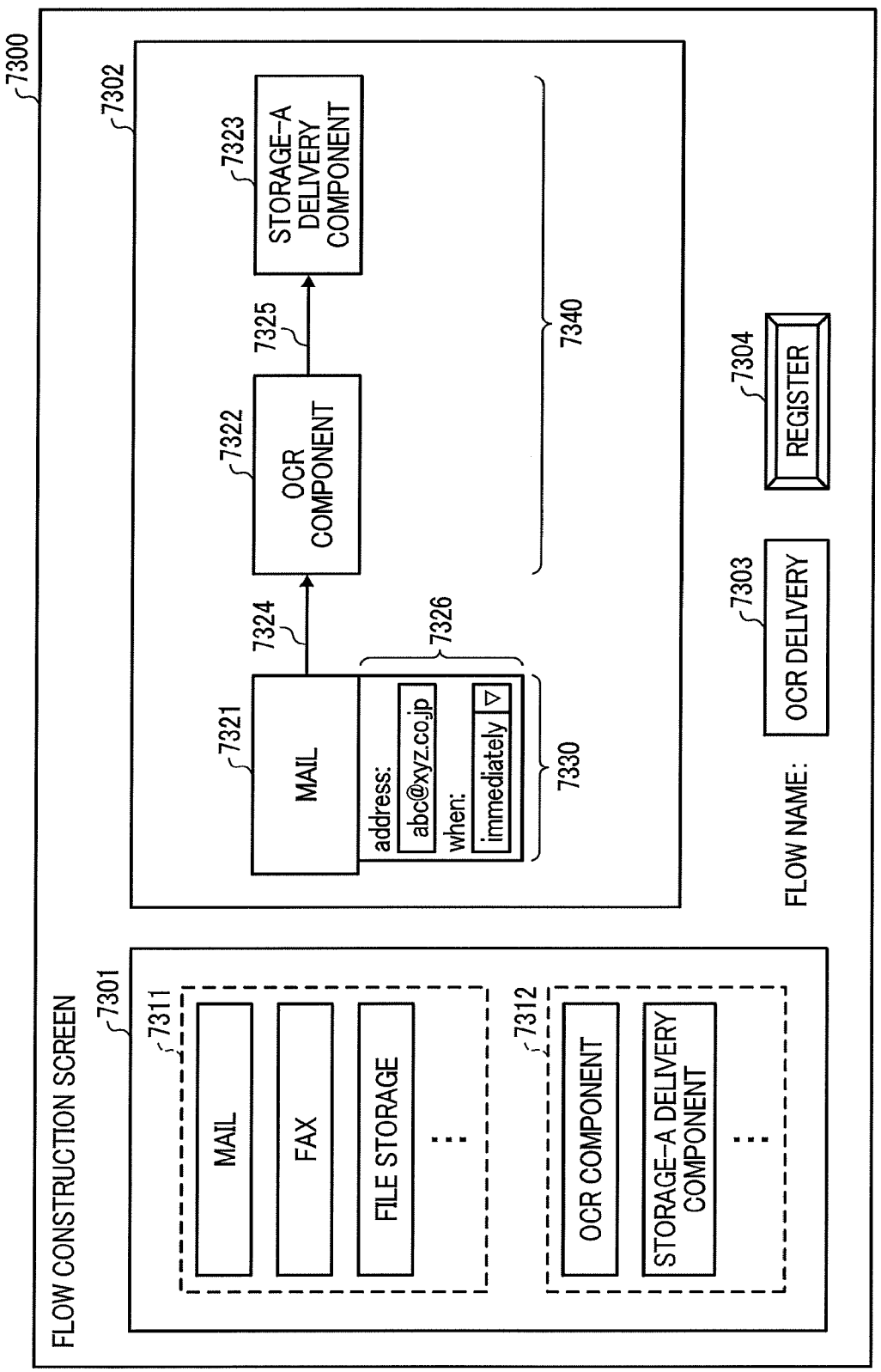
FIG. 25 is a view illustrating an example of a flow construction screen according to still another embodiment of the present disclosure.

The registration process unit 210A displays a flow construction screen 7300 as illustrated in FIG. 25, for example, based on the received screen information 6000 and construction information (S2215).

The flow construction screen 7300 illustrated in FIG. 25 is a screen that enables a user to generate a trigger and a process flow in a graphical manner. The flow construction screen 7300 includes a construction element display area 7301, a construction area 7302, a flow name field 7303, and a registration key 7304. Further, the construction element display area 7301 includes a trigger list 7311 and a component list 7312. In the trigger list 7311, a list of triggers, each being the construction element, is displayed. In the component list 7312, a list of components, each being the construction element, is displayed.

Specifically, in the trigger list 7311, a list of the trigger types contained in the trigger list information 5200 is displayed. Further, in the component list 7312, a list of the components contained in the component list information 5100 is displayed.

The user selects a desired one or more of the construction elements displayed in the construction elements display area 7301 and places the selected construction element(s) in the construction area 7302. Further, the user sets an order among the construction elements or sets a parameter in the construction area 7302 to generate the trigger and the process flow. Furthermore, the user may input a desired flow name in the flow name field 7303, and then select the registration key 7304 to register the generated trigger and process flow.

For example, a user first selects "MAIL" from the trigger list 7311, and then selects a desired position in the construction area 7302. In response to this user operation, the registration process unit 210A generates a construction element 7321 at the position selected by the user.

Next, the user selects "OCR COMPONENT" from the component list 7312, and then selects a desired position in the construction area 7302. In response to this user operation, the registration process unit 210A generates a construction element 7322 at the position selected by the user.

In substantially the same manner, the user selects "STORAGE-A DELIVERY COMPONENT" from the component list 7312, and then selects a desired position in the construction area 7302. In response to this user operation, the registration process unit 210A generates a construction element 7323 at the position selected by the user.

The user may drag and drop a constitution element from the trigger list 7311 or the component list 7312 to the construction area 7302 to generate the construction elements 7321 to 7323.

Subsequently, the user sets the order among the construction elements 7321 to 7323 by using an arrow 7324 and an arrow 7325. For example, the user drags a cursor or the like from the construction element 7321 toward the construction element 7322. In response to this user operation, the registration process unit 210A generates the arrow 7324 pointing to the construction element 7322 from the construction element 7321.

In substantially the same manner, for example, the user drags a cursor or the like from the construction element 7322 toward the construction element 7323. In response to this user operation, the registration process unit 210A generates the arrow 7325 pointing to the construction element 7323 from the construction element 7322.

Further, the user selects the construction element 7321 to set the option and the execution condition. Furthermore, the user selects the construction element 7322 or the construction element 7323 to set the parameter.

For example, in response to a user selection of the construction element 7321, the registration process unit 210A displays a setting area 7326. The setting area 7326 enables the user to configure settings of the option "address" and the execution condition "when" for the construction element 7321 as a trigger. In substantially the same manner, the parameters for the construction element 7322 and the construction element 7323, each being a component, can be set.

With the operation described above, the user is able to generate the construction element 7321 as a trigger 7330, and a process flow 7340 represented by the construction element 7322 and the construction element 7323. Further, the user enters the flow name "OCR DELIVERY" in the flow name field 7303, and then selects the registration key 7304. The registration process unit 210A may display an error message or the like in a case in which a construction element is set prior to the construction element 7321 as a trigger.

In response to a user selection of the registration key 7304 on the flow construction screen 7300 illustrated in FIG. 25, the registration process unit 210A sends, to the flow construction unit 114 of the service provision system 10, a request for registration of the trigger and the process flow (S2216). The request for registration of the trigger and the process flow contains information (the flow generation information) of the trigger 7330 and the process flow 7340 generated in response to user instructions via the flow construction screen 7300 illustrated in FIG. 25. In addition, the request for registration of the trigger and the process flow also contains the application name "APPLICATION 1" selected by the user at S2205. It should be noted that the request for registration of the trigger and the process flow may contain, as the flow generation information, the trigger information 2000 indicating the trigger 7330 and the process flow information 1100 indicating the process flow 7340.

In response to receiving the request for registration of the trigger and the process flow, the flow construction unit 114 generates the process flow information 1100 and the trigger information 2000 based on the flow generation information contained in the received registration request (S2217). Specifically, the flow construction unit 114 generates the trigger information 2000 based on the information of the trigger 7330 contained in the flow generation information. Further, the flow construction unit 114 generates the process flow information 1100 based on the information of the process flow 7340 contained in the flow generation information.

Next, the flow construction unit 114 sends a request for registration of the process flow to the application manager 111 (S2218). This request for registration of the process flow contains the process flow information 1100 generated at S2217 and the application name "APPLICATION 1" selected by the user at S2205.

In response to receiving the request for registration of the process flow, the application manager 111 stores, in the application information storage unit 150, the process flow information 1100 contained in the received registration request such that the process flow information 1100 is contained in the application information 1000 identified by the application name "APPLICATION 1" (S2219). The application manager 111 sends a result of the registration to the flow construction unit 114.

Thus, the process flow 7340 generated according to the user instruction is registered to the service provision system 10.

Next, the flow construction unit 114 sends a request for registration of the trigger to the trigger registration unit 122 (S2220). This request for registration of the trigger contains the trigger information 2000 generated at S2217.

In response to receiving the request for registration of the trigger, the trigger registration unit 122 stores the trigger information 2000 contained in the received registration request in the trigger information storage unit 160 (S2221). The trigger registration unit 122 sends a result of the registration to the flow construction unit 114.

Thus, the trigger 7330 generated according to the user instruction is registered to the service provision system 10. It should be noted that the processes of S2218 and S2220 in FIG. 22B may be performed in any suitable order. Accordingly, the process of S2220 may be performed prior to the process of S2218.

As described heretofore, in the third embodiment, the user of the device 20 is able to place the construction elements in a graphical manner on the flow construction screen 7300, and then set the order among the construction elements to generate the trigger and the process flow in a simple manner.

According to an embodiment of the present disclosure, a process flow is executed in response to an occurrence of a predetermined event.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. An information processing system including at least one information processing apparatus, the system comprising:
a memory to store, for each of a plurality of flows, each flow containing a series of processes executable to electronic data, flow information that defines program identification information identifying one or more programs executing the flow of series of processes and an execution order of the one or more programs, in association with flow identification information for identifying the flow information, and for each of a plurality of events, event identification information for identifying the event that triggers a start of execution of the flow of the series of processes, in association with the flow identification information and, in association with said each of the plurality of events, condition information indicating a condition for starting the execution of the series of processes associated with said each of the plurality of events; and circuitry configured to, based on an occurrence of an event, read the flow identification information associated with the event identification information identifying the occurred event, based on the occurrence of the event identified by the event identification information, determine whether a condition indicated by the condition information stored in the memory in association with the event identification information is satisfied, and based on a determination that the condition is satisfied, control the at least one information processing apparatus to execute each of the one or more programs in the execution order, as defined in the flow information identified by the read flow identification information, to perform the flow of series of processes executable on the electronic data.

2. The information processing system of claim 1, wherein the event identification information includes mail address information, and in a case in which the occurred event indicates that an email in which the mail address information is designated as a destination has been transmitted, the circuitry executes the flow of series of processes on the electronic data attached to the email.

3. The information processing system of claim 1, wherein the event identification information includes folder information indicating a storage destination in which the electronic data is to be stored, and in a case in which the occurred event indicates that the electronic data has been stored in the storage destination indicated by the folder information, the circuitry executes the flow of series of processes on the electronic data that has been stored in the storage destination.

4. The information processing system of claim 1, wherein the event identification information includes a facsimile number information, and in a case in which the occurred event indicates that the electronic data in which the facsimile number information is designated as a destination has been transmitted, the circuitry executes the flow of the series of processes on the electronic data.

5. The information processing system of claim 1, wherein the condition information is a condition indicating a time when the execution of the flow of the series of processes is to be started.

6. The information processing system of claim 1, wherein the circuitry is further configured to:

receive, from a device that is connected to the information processing system via a network, a request containing the event identification information and the flow identification information which are generated at the device; and in response to receiving the request from the device, store the event identification information contained in the request in association with the flow identification information contained in the request in the memory.

7. The information processing system of claim 6, wherein the request further contains the flow information which is generated at the device, and the circuitry further stores the flow information contained in the request in the memory in association with the flow identification information contained in the request.

8. The information processing system of claim 7, wherein the circuitry is further configured to provide the device with a screen for generating the event identification information, the flow identification information, and the flow information, and the request is received via the screen.

9. An information processing apparatus comprising:

a memory to store, for each of a plurality of flows each flow containing a series of processes executable to electronic data, flow information that defines program identification information identifying one or more programs executing the flow of series of processes and an execution order of the one or more programs, in association with flow identification information for identifying the flow information, and for each of a plurality of events, event identification information for identifying the event that triggers a start of execution of the flow of the series of processes, in association with the flow identification information and, in association with said each of the plurality of events, condition information indicating a condition for starting the execution of the series of processes associated with said each of the plurality of events; and circuitry configured to, based on an occurrence of an event, read the flow identification information associated with the event identification information identifying the occurred event, based on the occurrence of the event identified by the event identification information, determine whether a condition indicated by the condition information stored in the memory in association with the event identification information is satisfied, and based on a determination that the condition is satisfied, execute each of the one or more programs in the execution order, as defined in the flow information identified by the read flow identification information, to perform the flow of series of processes executable on the electronic data.

10. An information processing method performed by an information processing apparatus, the method comprising:

storing in a memory, for each of a plurality of flows each flow containing a series of processes executable to electronic data, flow information that defines program identification information identifying one or more programs executing the flow of series of processes and an execution order of the one or more programs, in association with flow identification information for identifying the flow information;

storing in the memory, for each of a plurality of events, event identification information for identifying the event that triggers a start of execution of the flow of the series of processes, in association with the flow identification information and, in association with said each of the plurality of events, condition information indicating a condition for starting the execution of the series of processes associated with said each of the plurality of events;

based on an occurrence of an event, reading the flow identification information associated with the event identification information identifying the occurred event;

based on the occurrence of the event identified by the event identification information, determine whether a condition indicated by the condition information stored in the memory in association with the event identification information is satisfied; and based on a determination that the condition is satisfied, executing each of the one or more programs in the execution order, as defined in the flow information identified by the read flow identification information, to perform the flow of series of processes executable on the electronic data.

* * * * *